(12) United States Patent
Deb et al.

(10) Patent No.: US 12,086,185 B2
(45) Date of Patent: *Sep. 10, 2024

(54) AGGREGATED PHYSICAL AND LOGICAL NETWORK MESH VIEW

(71) Applicant: o9 Solutions, Inc., Dallas, TX (US)

(72) Inventors: Mayuri Deb, Bangalore (IN); Narasimha Kamath, Bangalore (IN); S Pandiarajan, Bangalore (IN); Prashant Jhaba, Dehradun (IN); Koustuv Chatterjee, Gilbert, AZ (US)

(73) Assignee: o9 Solutions, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,137

(22) Filed: Sep. 28, 2023

(65) Prior Publication Data

US 2024/0111808 A1    Apr. 4, 2024

Related U.S. Application Data

(63) Continuation of application No. 17/979,498, filed on Nov. 2, 2022, now Pat. No. 11,809,495, which is a
(Continued)

(51) Int. Cl.
*G06F 16/901* (2019.01)
*G06F 16/904* (2019.01)
*G06F 16/906* (2019.01)

(52) U.S. Cl.
CPC ........ *G06F 16/9024* (2019.01); *G06F 16/904* (2019.01); *G06F 16/906* (2019.01)

(58) Field of Classification Search
None
See application file for complete search history.

(56) References Cited

U.S. PATENT DOCUMENTS

2005/0001849 A1   1/2005  Arcas
2008/0104532 A1   5/2008  Stambaugh
(Continued)

FOREIGN PATENT DOCUMENTS

WO   WO-2016205519 A1   12/2016

OTHER PUBLICATIONS

"U.S. Appl. No. 17/979,498, Non Final Office Action mailed Mar. 8, 2023", 21 pgs.
(Continued)

*Primary Examiner* — Alex Gofman
*Assistant Examiner* — Umar Mian
(74) *Attorney, Agent, or Firm* — Schwegman Lundberg & Woessner, P.A.

(57) ABSTRACT

Systems and techniques for aggregated physical and logical network mesh view are described herein. A selection may be obtained of a portion of a graph network data structure. Nodes may be identified in the portion of the graph network data structure. Geolocation data may be determined for each node of the nodes. Geographical boundaries may be calculated for the portion of the graph network data structure. A geographical map and a network map may be generated. A physical network view may be generated for display in the user interface as an aggregated view of the geographical map and the network map. The geographical map may represent a physical layer and the network map may represent a logical layer. The aggregated view may be output for display with a set of controls that correspond to the physical layer and a set of controls that correspond to the logical layer.

20 Claims, 34 Drawing Sheets

Related U.S. Application Data continuation of application No. 17/870,398, filed on Jul. 21, 2022, now abandoned.

(60) Provisional application No. 63/256,008, filed on Oct. 15, 2021.

(56) References Cited

U.S. PATENT DOCUMENTS

| | | |
|---|---|---|
| 2011/0085443 A1 | 4/2011 | Shikano |
| 2016/0359880 A1 | 12/2016 | Pang et al. |
| 2019/0286635 A1 | 9/2019 | Yu et al. |
| 2021/0191930 A1 | 6/2021 | Zeng et al. |
| 2021/0273860 A1 | 9/2021 | Nagarkar et al. |
| 2023/0123136 A1 | 4/2023 | Deb et al. |

OTHER PUBLICATIONS

"U.S. Appl. No. 17/979,498, Notice of Allowance mailed Jun. 28, 2023", 12 pgs.

"U.S. Appl. No. 17/979,498, Response filed Jun. 8, 2023 to Non Final Office Action mailed Mar. 8, 2023", 15 pgs.

```
Iterate through each node in Network:                           ⟵3300
        visitedNode = {}
Start exploring connected Node using incoming and outgoing edges :
Say Call a function : findGroupBy {

If Node is groupByAttribute  OR it's a visited Node OR can't be
grouped
                Return Node
        Else :
                Save node in visitedNode and create an object of groupByAttributeData and then
                recursively start exploring its connected nodes using incoming and outgoing edges
                to check whether the node can be grouped or not using the following conditions :
            {
              Let cannotbeGrouped = false ;
                If Node is group by Attribute :
                If groupByAttribute != Node.groupByAttribute OR
                groupByMember != Node.groupByMember :
    cannotbeGrouped = true
        Else
           cannotbeGrouped = false
           Save groupByAttribute and groupByMember inside
           groupByAttributeData
                Else :
                  cannotbeGrouped = true
                Return cannotbeGrouped
            }
                Return Node
}
If Node is not grouped :
        Save it in another grouped Node Map
Else :
        If groupByMember is present in groupByMemberNodesMap :
            Append this Node to child node list
        Else :
            Create group with groupByAttribute and groupByMember
            and save It inside groupByMemberNodesMap
```

*FIG. 33*

AGGREGATED PHYSICAL AND LOGICAL NETWORK MESH VIEW

CROSS-REFERENCE TO RELATED APPLICATION

This patent application is a continuation of U.S. patent application Ser. No. 17/979,498, filed on Nov. 2, 2022, which application is a continuation of U.S. patent application Ser. No. 17/870,398, filed on Jul. 21, 2022, which application claims the benefit of priority to U.S. Provisional Patent Application Ser. No. 63/256,008, filed on Oct. 15, 2021, and titled "AGGREGATED PHYSICAL AND LOGICAL NETWORK MESH VIEW," which are incorporated by reference in their entireties.

TECHNICAL FIELD

Embodiments described herein generally relate to network visualization and, in some embodiments, more specifically to an aggregated physical and logical network mesh view

BACKGROUND

A networks may be represented as a physical network or a map view, or a logical network. For example, a supply chain network logical view may be supported by enterprise resource planning (ERP) systems and may be built using granular data). A physical network view or a logical network view may not provide visibility into operations within a particular component of network components or other entities that may affect the network. A user may desire to view a representation of the network that provides visibility of the network components or the other entities that affect the network.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 33 illustrates an example of a group creation algorithm for aggregated physical and logical network mesh view, according to an embodiment.

DETAILED DESCRIPTION

Figure 1:
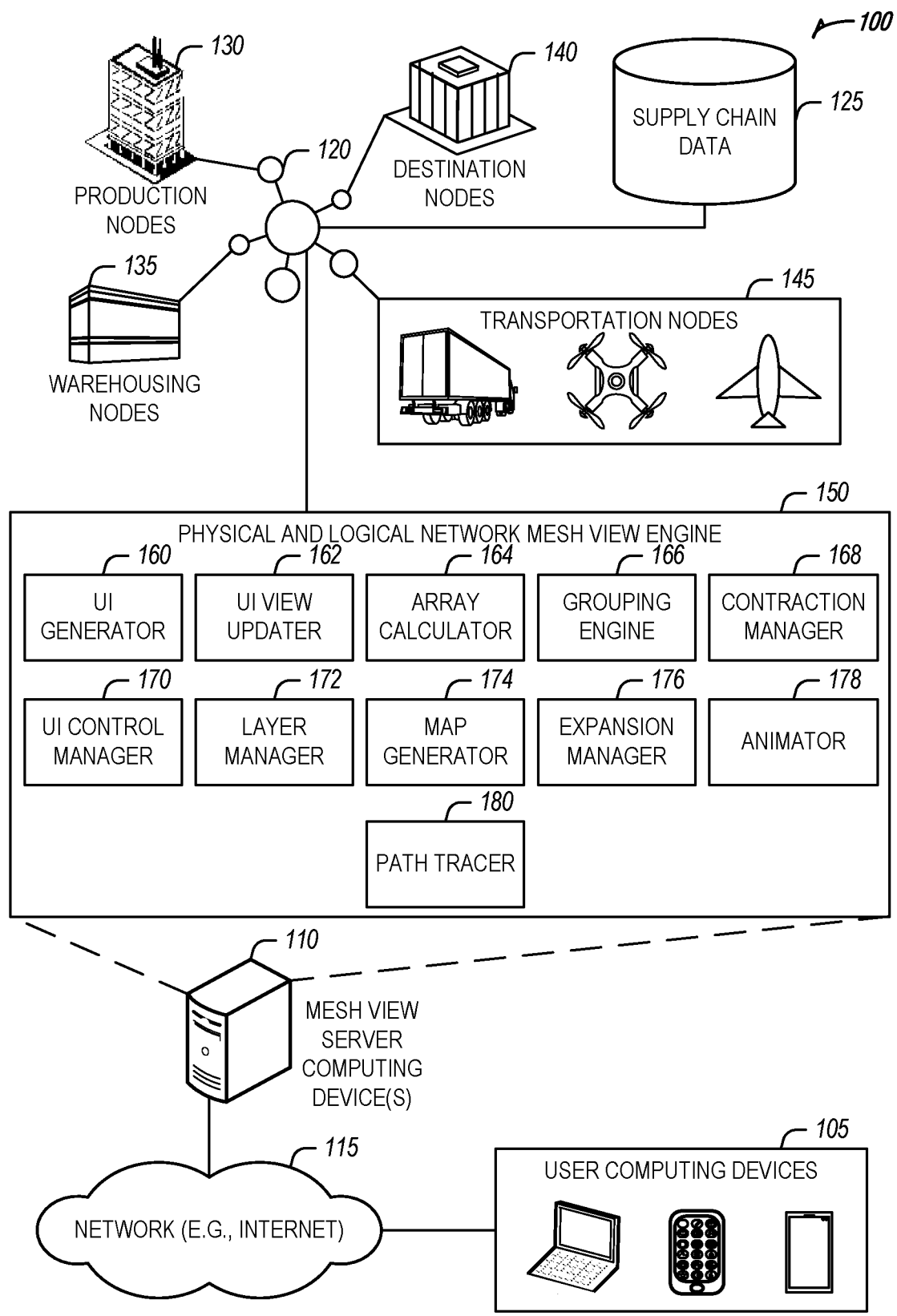
FIG. 1 is a block diagram of an example of an environment and a system for an aggregated physical and logical network mesh view, according to an embodiment.

Supply chains of modern enterprises competing in global markets are complex and dynamic. Supply chain decisions made daily across businesses significantly impact the planet. Visibility of end-to-end (E2E) connected supply chains is a foundation and first step towards accelerating the speed and quality of decision-making processes. The complexity and dynamic nature of modern supply chains requires computing systems to perform millions of calculations throughout a graph network structure that includes nodes that represent products, product components, production processes, transportation elements, etc. connected via edges that represent relationships and pathways between the nodes of the graph network. A graph network of a modern supply chain may include millions of nodes and edges and millions of calculations may be required to make predictions regarding activities within the supply chain to ensure that supply flow is adequate to meet demands within the network. The complexity of supply chain calculations has made it necessary to perform calculations via computing devices that can perform the high-volume calculations that could not be completed by humans within a time window necessary to make decisions and trigger actions within the supply chain to effectively meet the demands. Supply chain calculations (e.g., availability, supply flow, demand flow, transportation flow, etc.) may require millions of calculations and may result in raw data that may include complex data views that may not be interpretable in native form by a human. To enable interpretation of the supply chain data, the systems and techniques discussed herein transform the raw data into graphical views that enable a user to understand states of the supply chain network.

Conventional representations of an E2E supply chain network use a physical network or a map view or a logical network view supported by enterprise resource planning (ERP) systems (e.g., built using granular data). Both of these conventional representations are siloed showing either physical aspects of the network or logical aspects of the network for a limited subset of a domain of the supply chain network datasphere. Conventional approaches to visually representing an E2E supply chain do not provide visibility into different series of operations within a particular plant or other entities that impact supply paths within the network and do not provide a display of a complete E2E supply chain graph network.

The systems and techniques discussed herein enable E2E supply chain network visibility that enables a view of a physical E2E supply chain network using geographically mapped entity locations (e.g., representing nodes of a supply chain graph network, etc.) and enabling a display that may be seamlessly transitioned to a logical network (e.g., a logical arrangement of nodes and edges of the supply chain graph network, etc.) or other detailed view of the supply chain graph network. In various embodiments, transition may be enabled through zoom in/out and dragging user interface controls.

FIG. 1 is a block diagram of an example of an environment 100 and a system 150 for aggregated physical and logical network mesh views, according to an embodiment. The environment 100 may include user computing devices 105 (e.g., client computing devices, mobile computing devices, tablet computing devices, etc.) and mesh view server computing device(s) 110 (e.g., a standalone server computing device, a cluster of computing devices, a cloud computing platform, etc.) that may be communicatively coupled via a network 115 (e.g., a wired network, wireless network, cellular network, satellite communication network, the internet, etc.). The mesh view server computing device(s) 110 may include the system 150. In an example, the system 150 may be a physical and logical network mesh view engine. The physical and logical network mesh view engine may be a collection of processing circuitry and memory that includes instructions for generating visual representations of physical and logical layers of a supply chain graph network 120 and may receive and process inputs to formulate resultant outputs.

The system 150 may be communicatively coupled (or may obtain data from) the supply chain graph network 120 that may include a variety of nodes that represent, by way of example and not limitation, production nodes 130, warehousing nodes 135, destination nodes 140, and transportation nodes 145. The supply chain graph network 120 may be generated from, include, or may be updated using supply chain data 125. The supply chain graph network 120 is a data structure that defines nodes and edges of a supply chain that is used to calculate and track the movement of raw materials through production and delivery of products to end points (e.g., retailers, consumers, etc.). The mesh view server computing device(s) 110 provide a visual representation of the underlying mesh network of a physical and logical supply chain graph network 120. The supply chain data 125 may represent a data aggregator that may collect information from a variety of internal (e.g., within a network of the supply chain graph network 120) data sources and external data sources. The aggregated data may be input into the supply chain graph network 120 for generating and updating nodes and edges within the supply chain graph network 120 and for performing other data-centric actions within supply chain graph network 120.

The system 150 may include a variety of components including a user interface (UI) generator 160, a UI view updater 162, an array calculator 164, a grouping engine 166, a contraction manager 168, a UI control manager 170, a layer manager 172, a map generator 174, an expansion manager 176, an animator 178, and a path tracer 180. The components of the system 150 may be implemented in a single computing device or may be implemented singly or in various combinations across a variety of computing devices. The components may be implemented in hardware (e.g., field programmable gate arrays (FPGAs), application specific integrated circuits (ASICs), system on chip (SoC), etc.) or may be implemented as software circuits that may be stored as instructions in a machine-readable medium executed by at least one processor.

The supply chain graph network 120 is visualized in different forms. For example, the supply chain may be presented in a logical visualization. The logical visualization represents a configuration of physical network elements. For example, a logical visualization may include a set of logistical data based flow pathways for raw materials between a manufacturer and raw material sources. For example, there may be an impediment in a supply of raw materials from a source defined in the physical network and a flow from the source with the impediment may be omitted from the logical visualization while the flow may be presented in the physical representation. Here the supply chain is visualized using icons and parameters. The logical view may be cluttered and may not convey useful information when representing a real-world complex supply chain. The systems and techniques discussed herein enable efficient visual representation of the supply chain by grouping logical entities based on location to form node clusters. The nodes which are part of a grouped node cluster are called child nodes (e.g., children of the group). There may be multiple clusters depending on a number of locations in the logical supply chain. Two node clusters may be connected via one or more operations which are also grouped. The supply chain visibility systems and techniques discussed herein enable an easy to digest visual representation of the supply chain that enables users to quickly look at the network at an aggregated level and in a detailed level.

Figure 2:
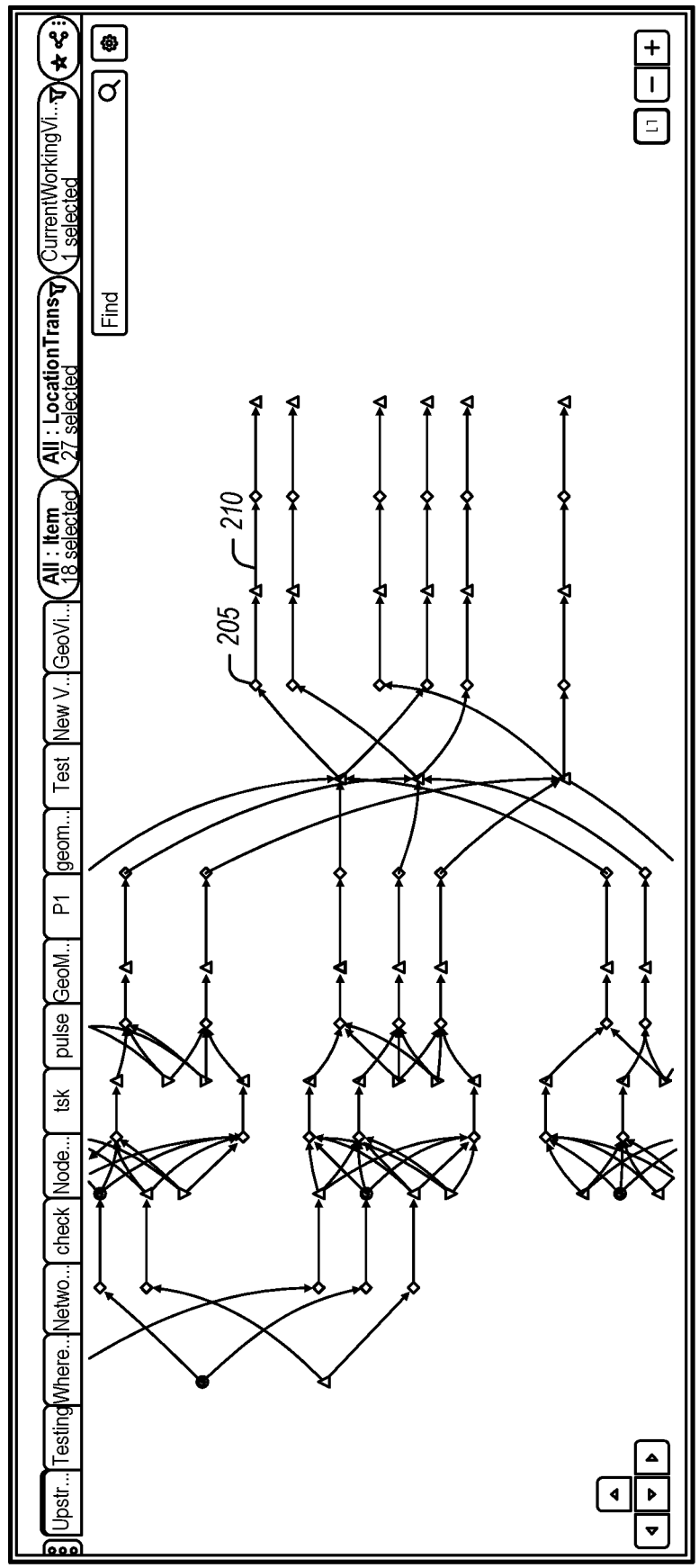
FIG. 2 illustrates an example of a large and complex logical network view that represents nodes and edges of a supply chain graph network, according to an embodiment.

FIG. 2 illustrates an example of a large and complex logical network view 200 that represents nodes (e.g., node 205, etc.) and edges (e.g., edge 210, etc.) The logical representation of the network may be generated using a hierarchy or data structure of the supply chain graph network.

Returning to the description of FIG. 1, the system 150 enables a unique user interface experience for the user as a visual representation of the supply chain graph network 120 and status of the supply chain graph network 120 using information that may not be readily recognizable by a human that includes an aggregate map view that may transition to a detailed plan level view. The system 150 generates a visualization of the E2E supply chain that enables users to seamlessly transition from a physical network view to a logical network view, and to drill down further within the logical network view to reveal underlying operational data that has been used to generate the visualization.

Maps (e.g., map of a geographical area, satellite map, etc.) are plotted in the background and display location networks (e.g., networks for a regional area, geographic area, logical division of the supply chain, etc.) connected with each other with a supply flowing through various nodes of the location networks. Controls are provided in the visualization that include zooming, dragging, etc. An event network (e.g., a network of activities occurring within the network, etc.) of a target segment of the E2E supply chain are displayed and adjusted upon activating a zoom and/or drag control. Hover controls are provided in the visualization to enable display of underlying data including, by way of example and not limitation, attributes such as key performance indicators (KPIs).

The UI generator 160 may generate graphical user interfaces using output from the UI control manager 170, the map generator 174, and the layer manager 172. The UI generator 160 may generate views of the nodes and edges of the supply chain graph network 120. In a particular view, traversal of the supply chain may display a static network and may display problem paths by highlighting or otherwise providing a readily recognizable display element to draw attention of a user to a problem path. Cards (e.g., informational display elements, call outs, etc.) may be attached to nodes in the user interface that display attributes of the nodes such as, by way of example and not limitation, key performance indicators, that display information that includes actionable insights upon which the user may act.

The UI control manager 170 may generate controls for display by the UI generator 160. For example, the UI control manager 170 may generate node cards that may provide attributes and other information for a node based on configuration options selected for a view of the supply chain graph network 120. The controls may be generated in part based on information obtained from the supply chain graph network such as, by way of example and not limitation, labels, dropdown menu contents, available control options, attributes, control instructions sets, and the like. The controls output by the UI control manager 170 may be used by the UI generator 160 in rendering (or providing instructions to render) views of the supply chain graph network 120.

Non-limiting examples of controls that may be generated by the UI control manager 170 for a map view (e.g., a map layer control set generated by the layer manager 172) include a location label control for the map that displays a descriptive location label by default and an enablement control may be selected by the user to enable or disable the location label. A map lock control may be generated that locks the map view to fix display of the map on the map view when selected by the user. A flow plan control may allow a user to enable and disable a flow volume display. A legend control may be generated that enables a user to perform marker formatting and edge formatting and enable or disable legends. An edge control may enable a user to show or hide edges of the supply chain graph network 120.

Non-limiting examples of controls that may be generated by the UI control manager 170 for a logical view (e.g., a logical layer control set generated by the layer manager 172) include an activity label control that facilitates user interaction to enable or disable activity labels (by default, activity labels may be disabled), a network view lock control may function similar to the map view lock that locks the network view when activated so that the user may maintain display of a logical view, a flow plan control may be provided to enable and disable display of flow volume, and a legend control may be provided for marker formatting and edge formatting and to enable or disable the legends.

The map generator 174 may obtain geographical information for a geographic area associated with selected supply chain management network 120 data or a selected segment of the supply chain management network 120. The map generator 174 may generate a map for the subject area and may work in conjunction with the UI generator 160 to plot nodes and edges on a generated map based on geographical coordinates, addresses, etc. associated with the nodes and edges. In an example, the map generator 174 may generate a world map for display of the supply chain graph network data. The UI generator 160 may aggregate or otherwise simplify supply chain graph network 120 data for display in the generated world map. The UI generator 160 may provide additional detail (e.g., less aggregation, more granularity, etc.) as the geographical area is refined and the map generator 174 generates more detailed maps for the refined geographical area (e.g., displaying towns, townships, county roads, local streets, etc.).

The layer manager 172 may generate and maintain a variety of layers that may be overlayed on the map generated by the map generator 170 and output for display by the UI generator 160. The layers generated by the layer manager 172 may be displayed or hidden based on selections made by a user using a layer control object generated and managed by the UI control manager 170. The available layers may be generated based on data present in a selected region or subset of the supply chain graph network 120. Generating only applicable layers reduces processing load by preventing generation and memory loading of layers that may not be used in the current view. The layers may include controls or a set of controls generated by the UI control manager 170.

Figure 3:
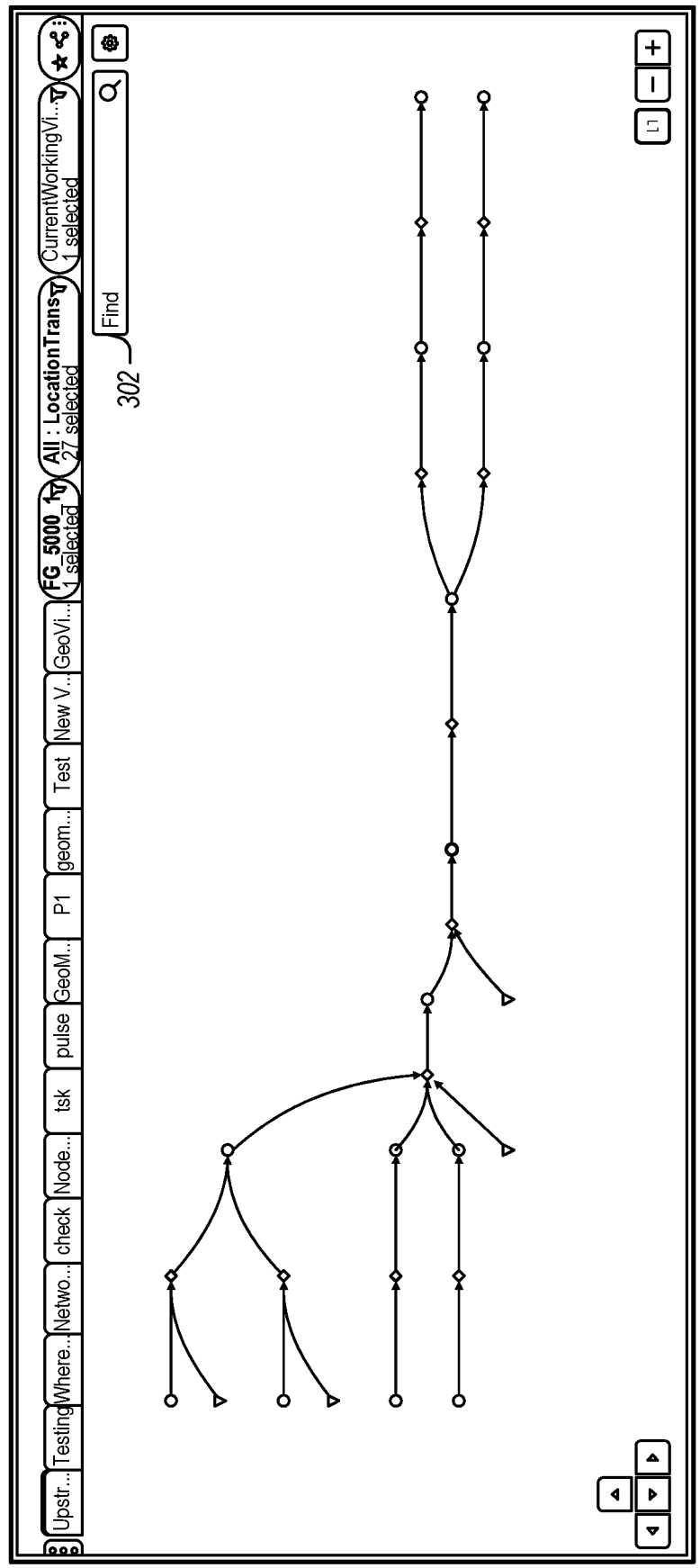
FIG. 3 illustrates an example of a selected segment of a logical view of graph network data for an aggregated physical and logical network mesh view, according to an embodiment.
Figure 4:
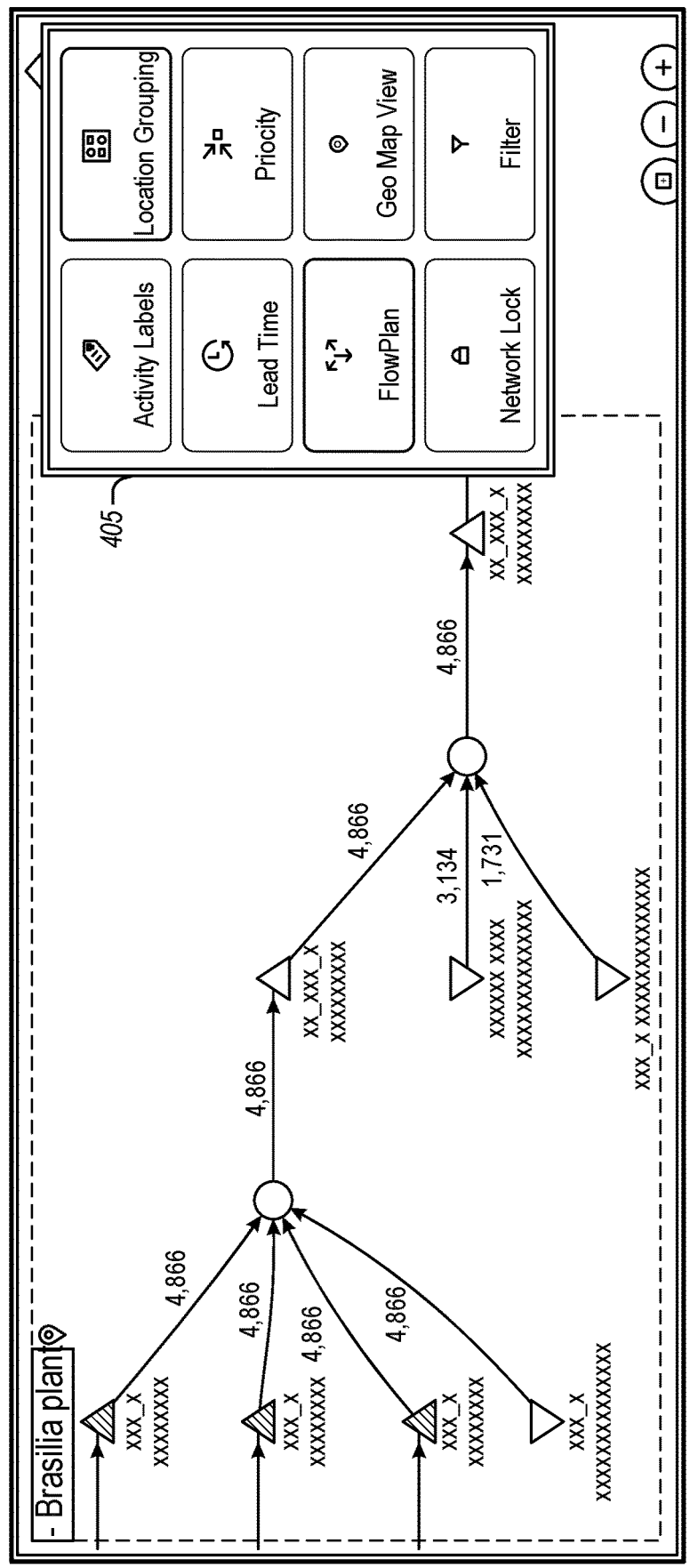
FIG. 4 illustrates an example of a filter selection control view 400 that includes a filter control for an aggregated physical and logical network mesh view, according to an embodiment.
Figure 5:
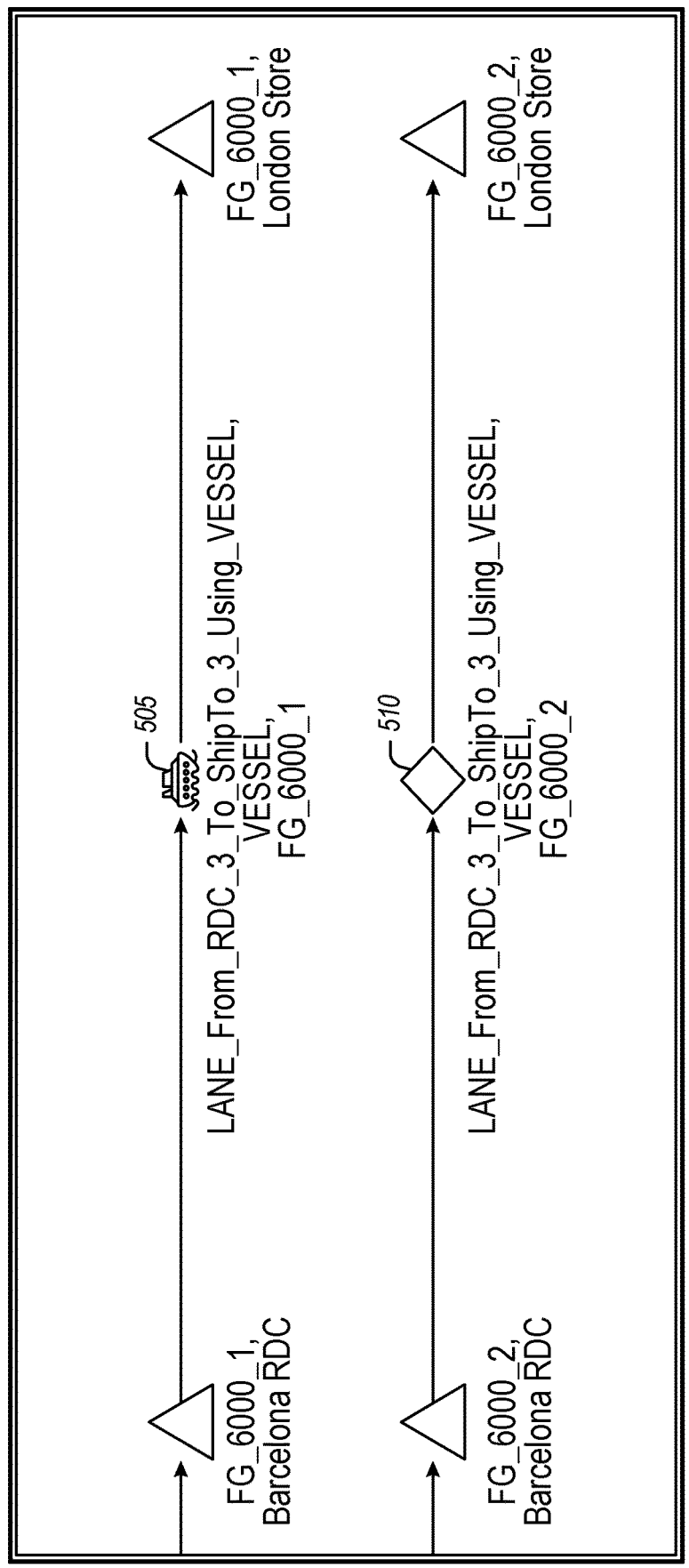
FIG. 5 illustrates an example of presentation of different entities of the network using various shapes, icons, and images for an aggregated physical and logical network mesh view, according to an embodiment.
Figure 6:
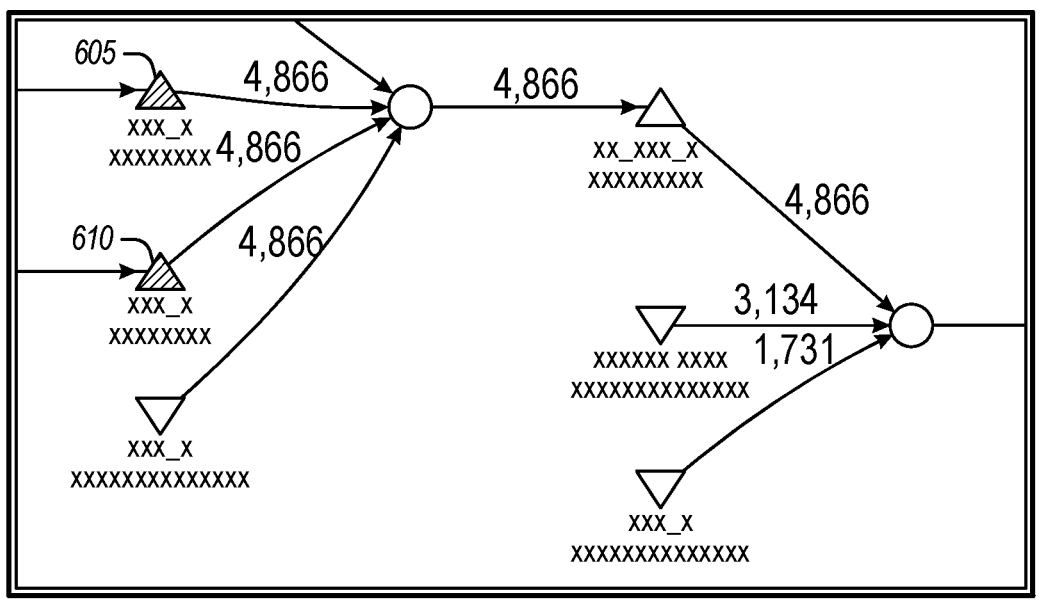
FIG. 6 illustrates an example of a user interface that highlights problems in the network using conditional formatting for an aggregated physical and logical network mesh view, according to an embodiment.

FIG. 3 illustrates an example of a selected segment 300 of a logical view of graph network data (e.g., a segment of the large and complex network 200 as described in FIG. 2, etc.) selected from a variety of different segmentation options presented in a control included in a UI that enables a user to view a part of the network 200. A find control 302 may be provided that the user may activate to quickly point focus on a particular entity. FIG. 4 illustrates an example of a filter selection control view 400 that includes a filter control 405 that enables the user to view a network up to a constrained point in network. FIG. 5 illustrates an example of presentation 500 of different entities (e.g., a first entity 505 and a second entity 510) of the network using various shapes, icons, and images. FIG. 6 illustrates an example of a user interface that highlights problems in the network using conditional formatting (e.g., using colors, etc.). For example, a first node 605 and a second node 610 may be displayed in a different color from other nodes based on data anomalies detected in the viewed section of the logical view that flow through the first node 605 or the second node 610. A variety of highlighting techniques may be used to draw the attention of a user to a problem flow such as, by way of example and not limitation, an edge may be represented by a red line rather than a green line, nodes that are on a flow with a data anomaly may be displayed in larger scale (e.g., bigger, etc.) than nodes that are not on a flow with a data anomaly, etc.

Figure 7:
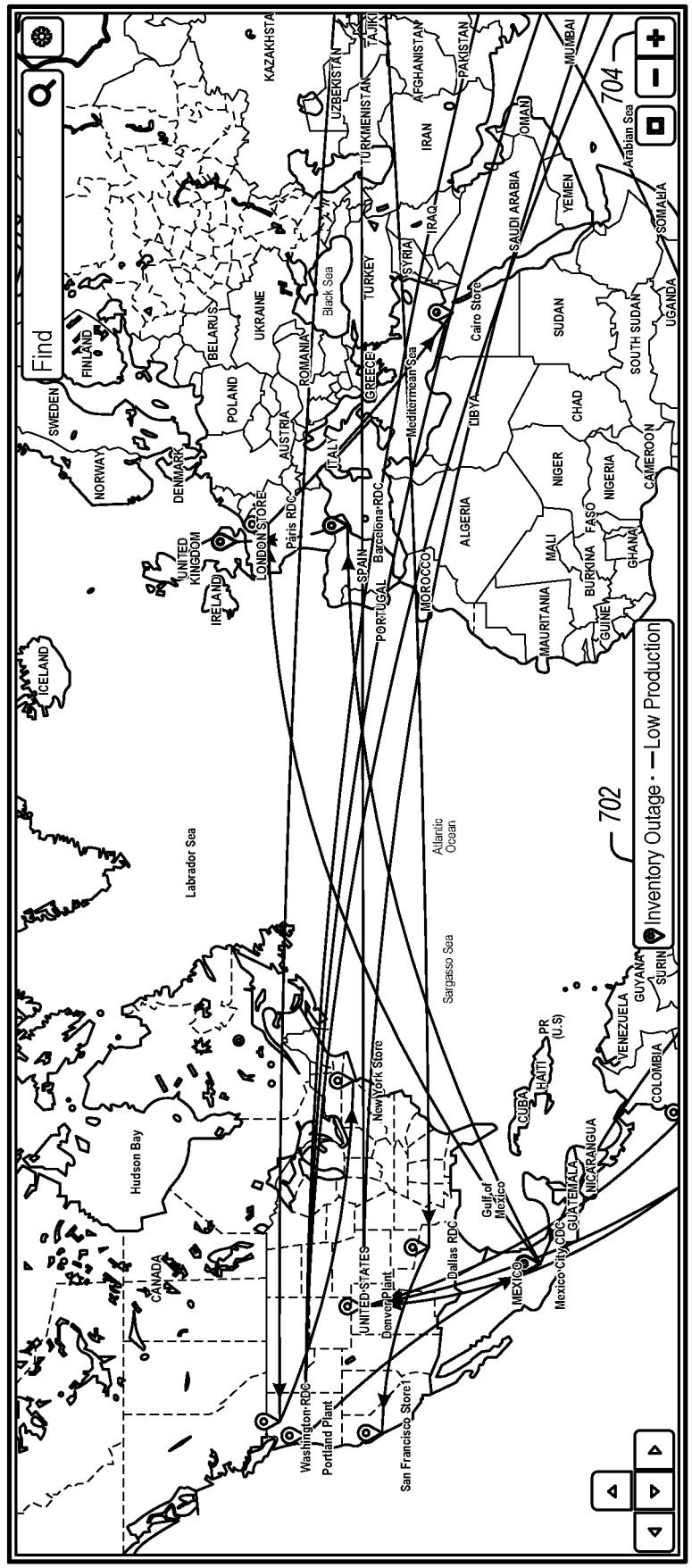
FIG. 7 illustrates an example of a physical network view that depicts an example of logical supply chain graph network elements correlated with physical locations on a map that represents a real flow of products plotted on the map view for an aggregated physical and logical network mesh view, according to an embodiment.

FIG. 7 illustrates an example of a physical network view 700 that depicts an example of logical supply chain graph network elements correlated with physical locations on a map that represent a real flow of products plotted on the map view for an aggregated physical and logical network mesh view, according to an embodiment. Problem paths and centers are well lit, allowing the user to find the problem path in one glance. Traversal across the view is completed with navigation keys 702 or movements in the cursor. Similarly, users may zoom in/out using the buttons 704 or cursor. The user may hover on problem points to activate a detail control that may obtain further detail on key performance indicators (KPIs), etc.

Figure 8:
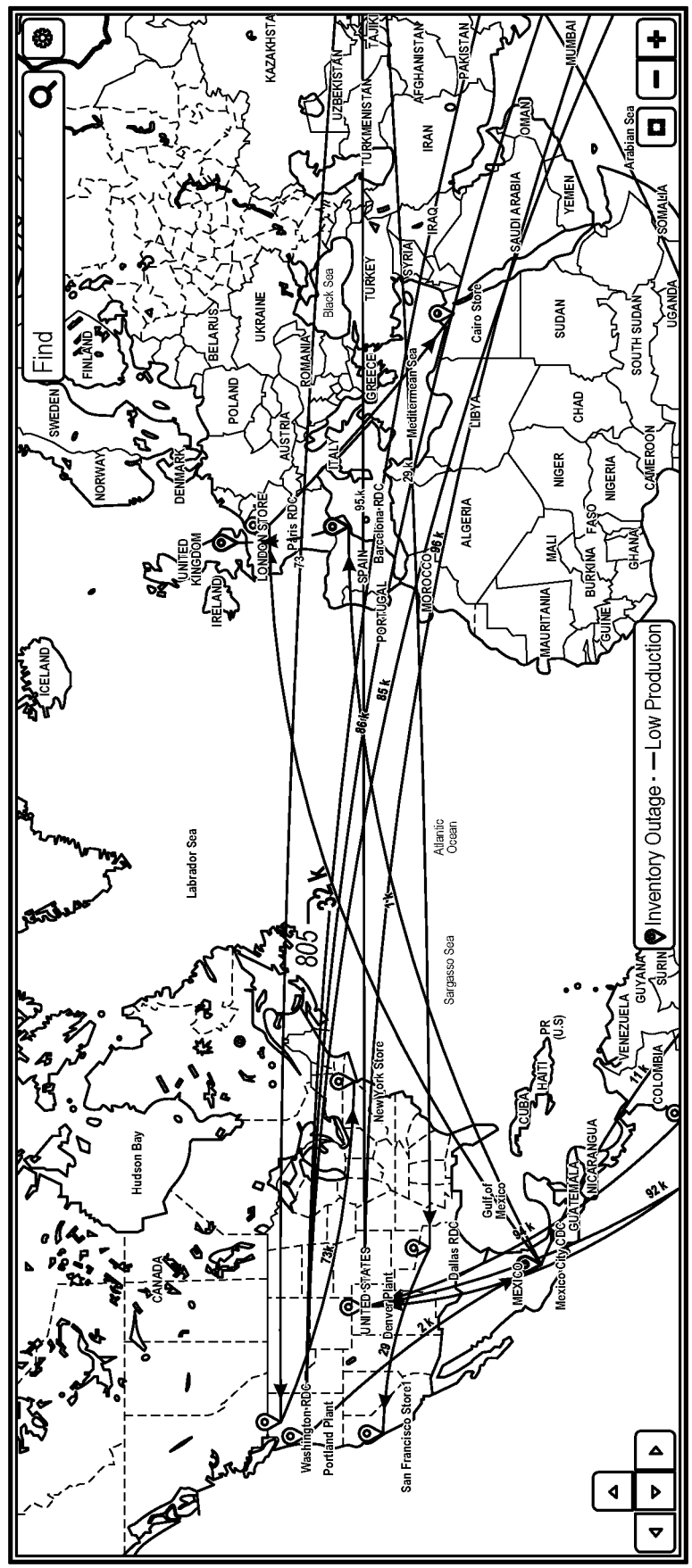
FIG. 8 illustrates an example of activation of an interface element that enables a view of a quantity flow using the paths in the physical network view for an aggregated physical and logical network mesh view, according to an embodiment.

FIG. 8 illustrates an example of activation of an interface element (e.g., a control generated by the UI control manager 170, etc.) that enables a view 800 of quantity flows (e.g., quantity flow 805, etc.) using the paths in the physical network view 700 as shown in FIG. 7.

Figure 9A:
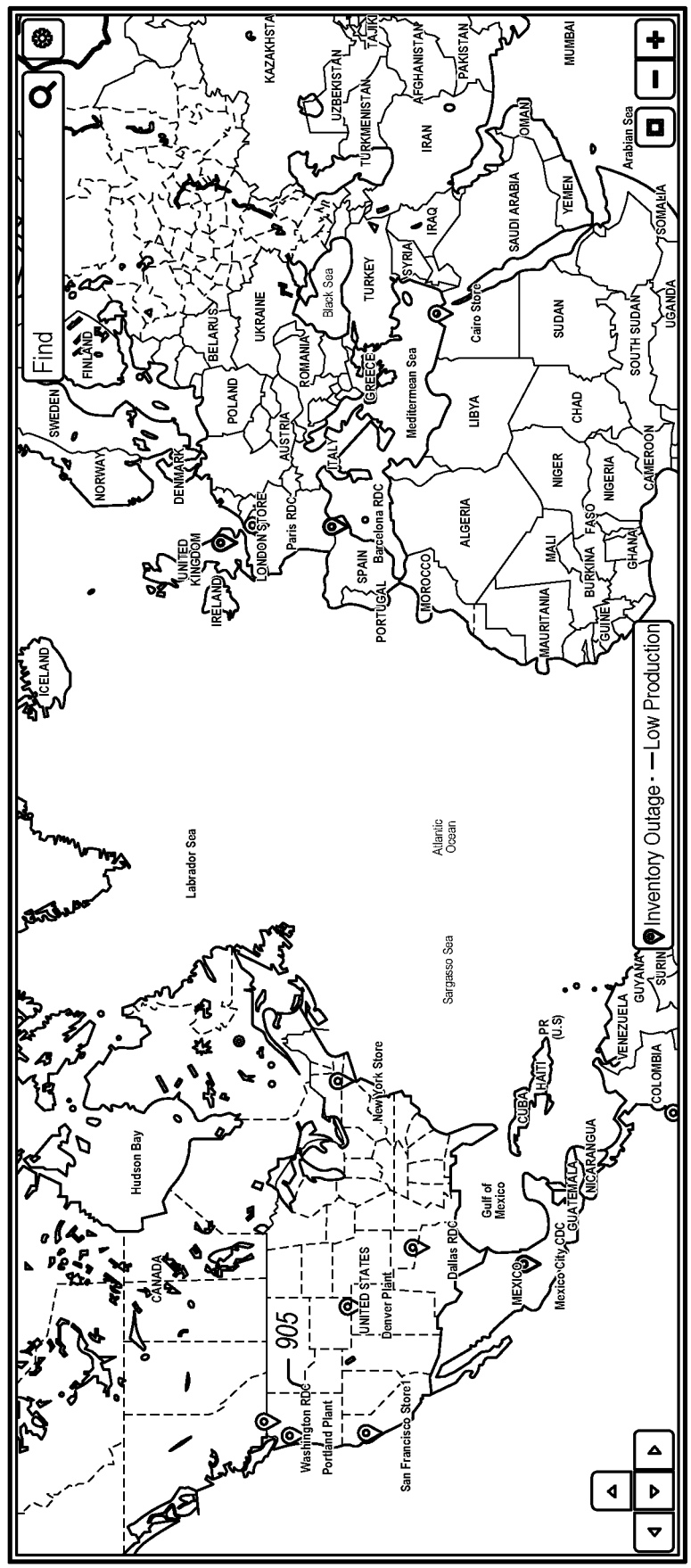
FIGS. 9A and 9B illustrates an example of activation of a user interface control that enables and disables location labels for an aggregated physical and logical network mesh view, according to an embodiment.
Figure 9B:
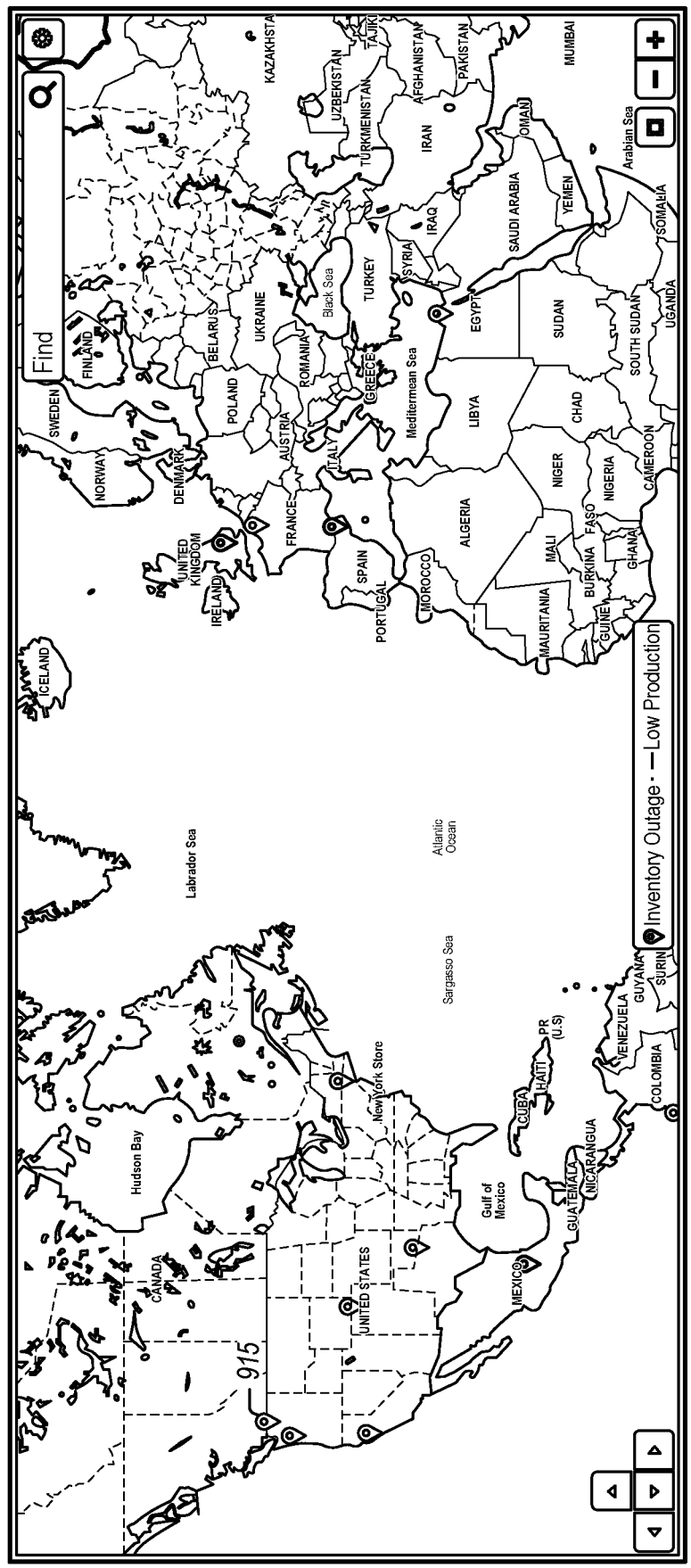

FIGS. 9A and 9B illustrate a first view 900 that displays location labels (e.g., location label 905, etc.) and a second view 910 that displays locations as pins (e.g., pin 915, etc.) without labels.

Figure 10:
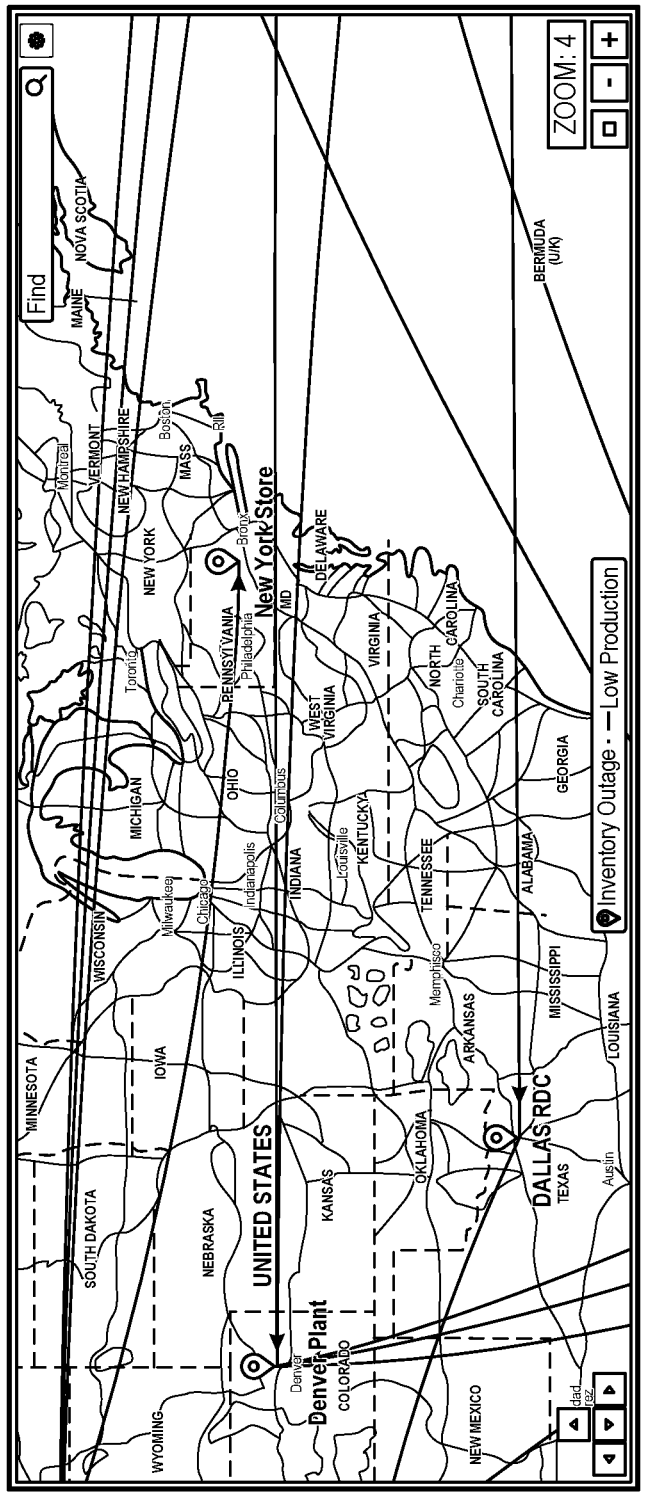
FIG. 10 illustrates an example of a zoom 4 level view for an aggregated physical and logical network mesh view, according to an embodiment.
Figure 11:
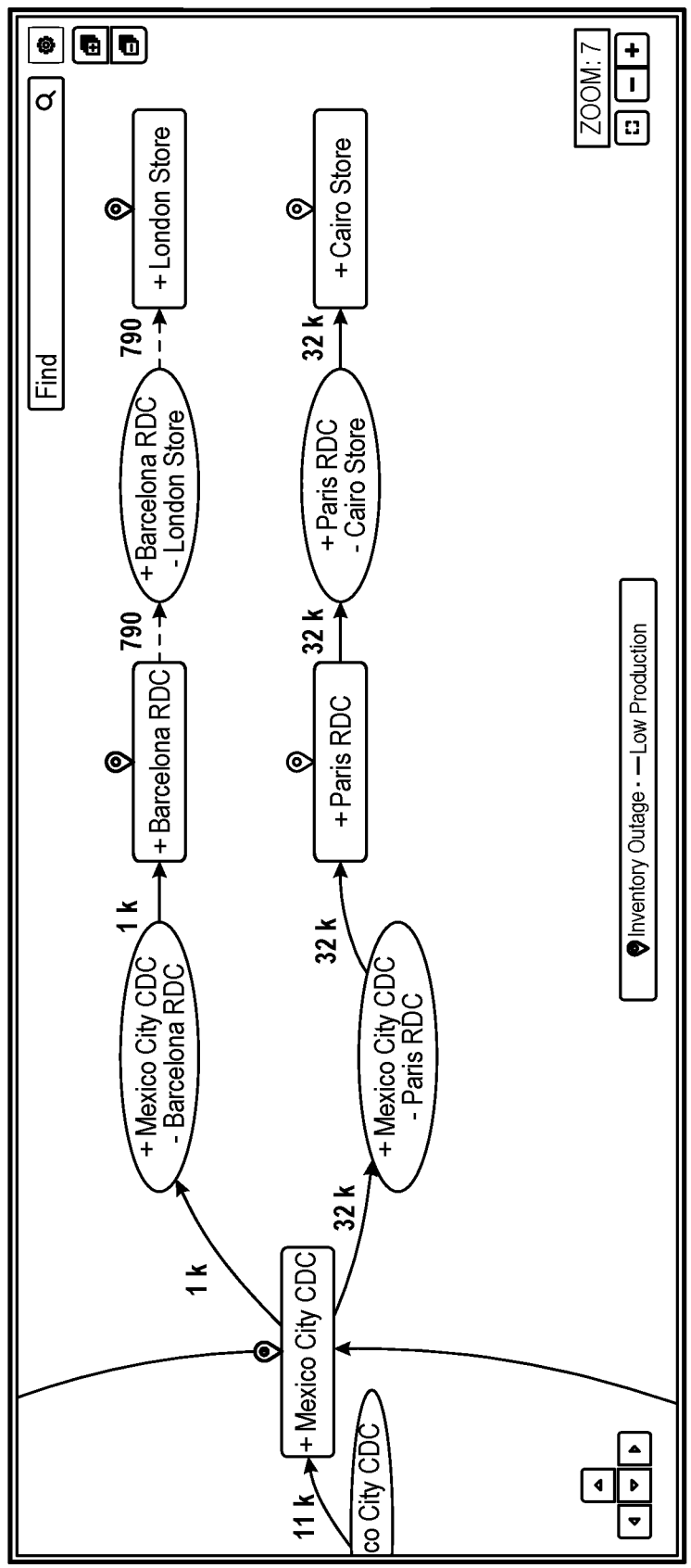
FIG. 11 illustrates an example of a zoom 7 level view that causes a transition from a physical network view to a logical network view based on the zoom level for an aggregated physical and logical network mesh view, according to an embodiment.

FIG. 10 illustrates an example of a zoom 4 level view 1000. FIG. 11 illustrates an example of a zoom 7 level view 1100 that causes the UI generator 160 to transition from the physical network view to a logical network view (e.g., a detailed view) based on the zoom level.

Figure 12:
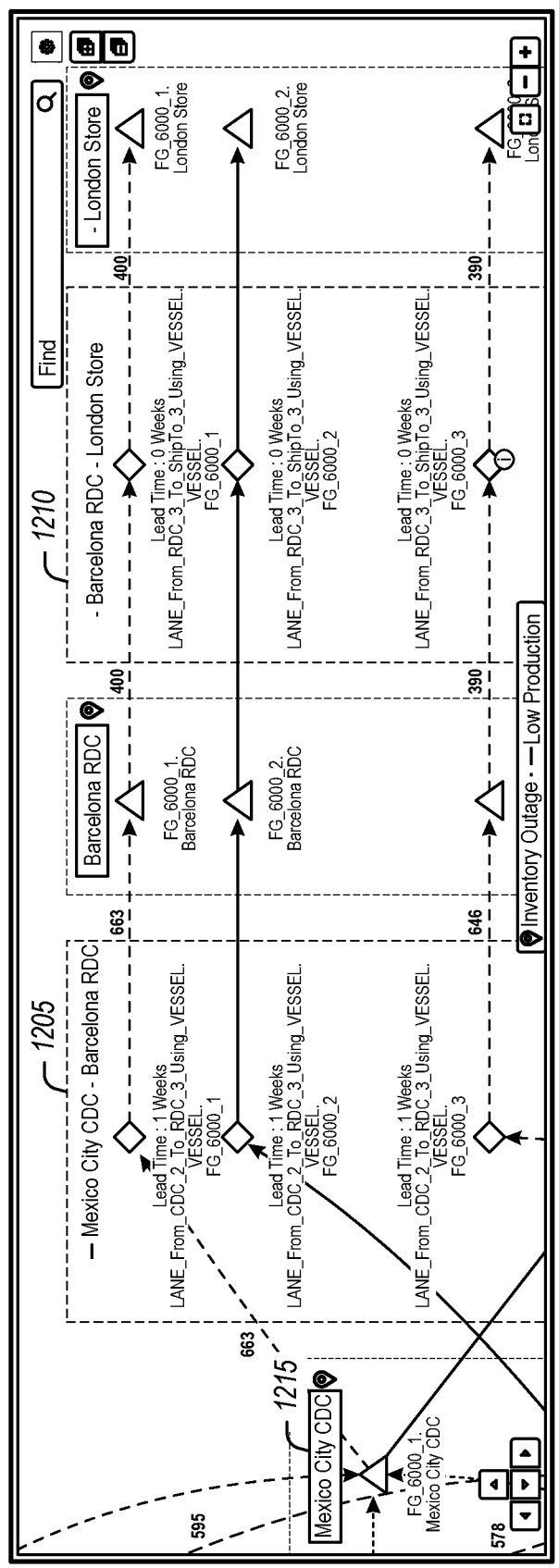
FIG. 12 illustrates an example of a logical view that shows locations without display of a map to present a physical representation of the network for an aggregated physical and logical network mesh view, according to an embodiment.

FIG. 12 illustrates a logical view 1200 that shows locations (e.g., Mexico City location 1205, Barcelona Location 1210, etc.) without display of a map to present a physical representation of the network. For example, activities between the Mexico City location 1205 and the Barcelona location 1210 may be shown in the logical view 1200. The user may activate user interface controls to expand a location (e.g., Mexico City CDC 1215) and may see items and activities inside the selected location. Quantities of goods flowing between different point within the selected location may also be presented in the display. The logical view 1200 may enable the user to view conditional formatting and KPIs for nodes of the logical supply chain network that represents data elements of the supply chain graph network 120 as well as conditional formatting for edges of the logical supply chain network.

Figure 13:
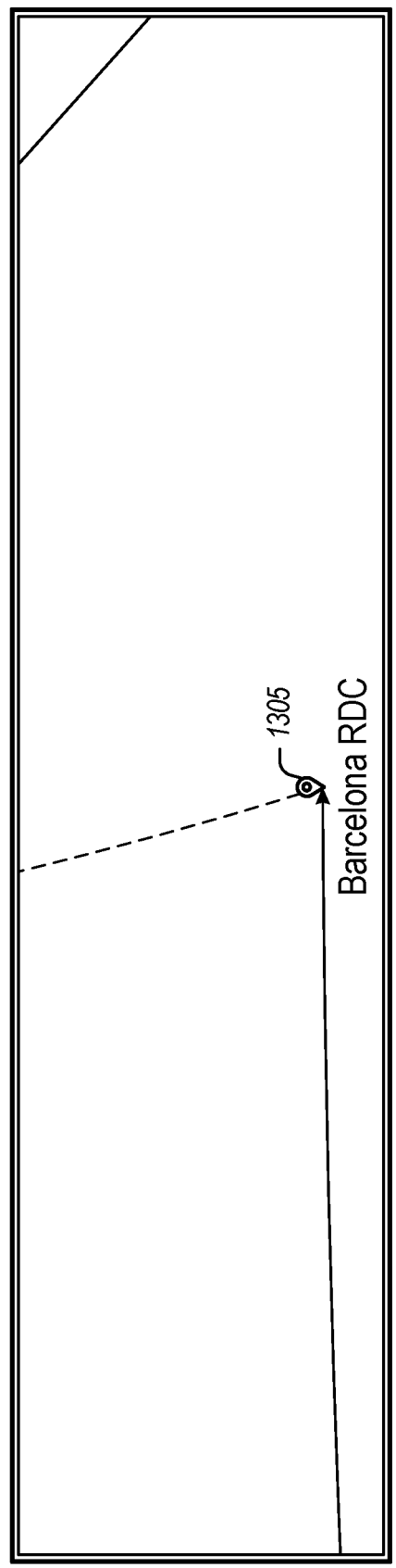
FIG. 13 illustrates an example of a location view in a center of a viewport for an aggregated physical and logical network mesh view, according to an embodiment.
Figure 14:
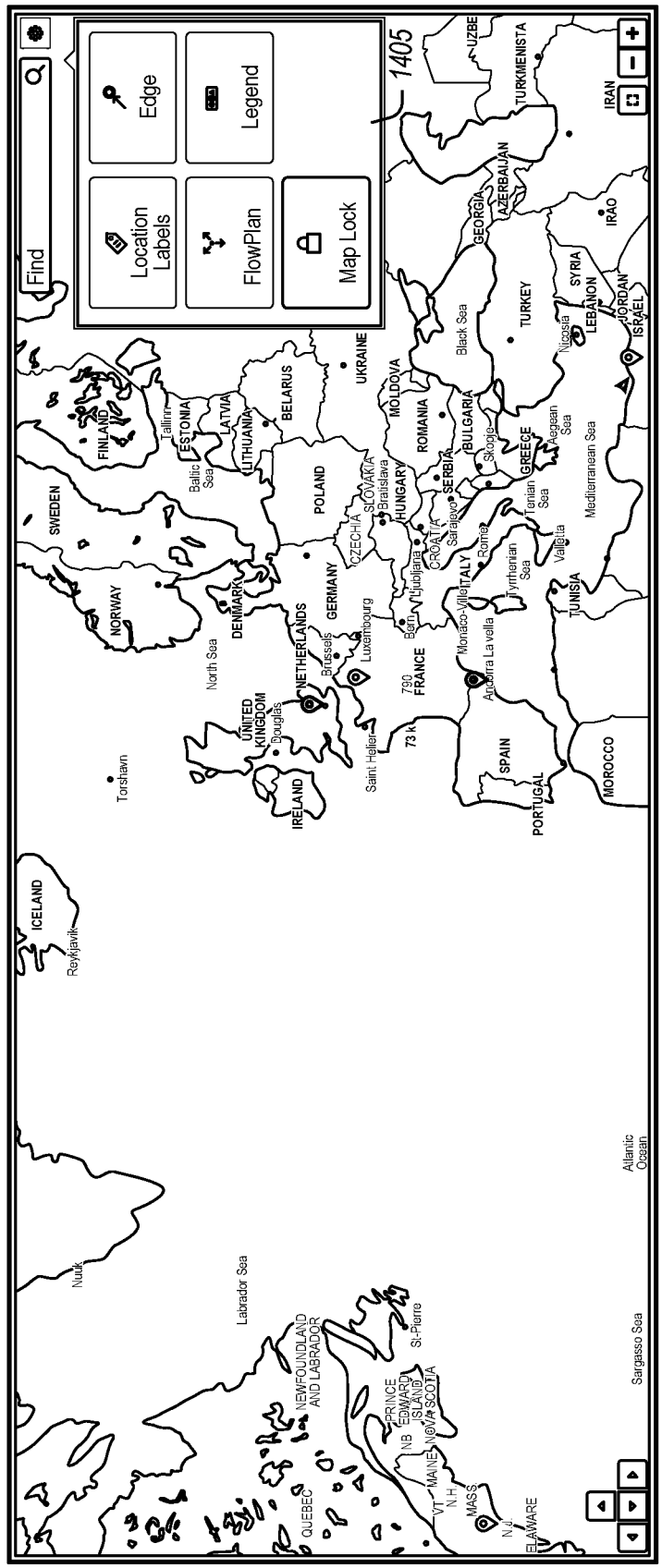
FIG. 14 illustrates an example of a map view with location labels, edges, flow plans, and legends controls in a disabled mode for an aggregated physical and logical network mesh view, according to an embodiment.
Figure 15:
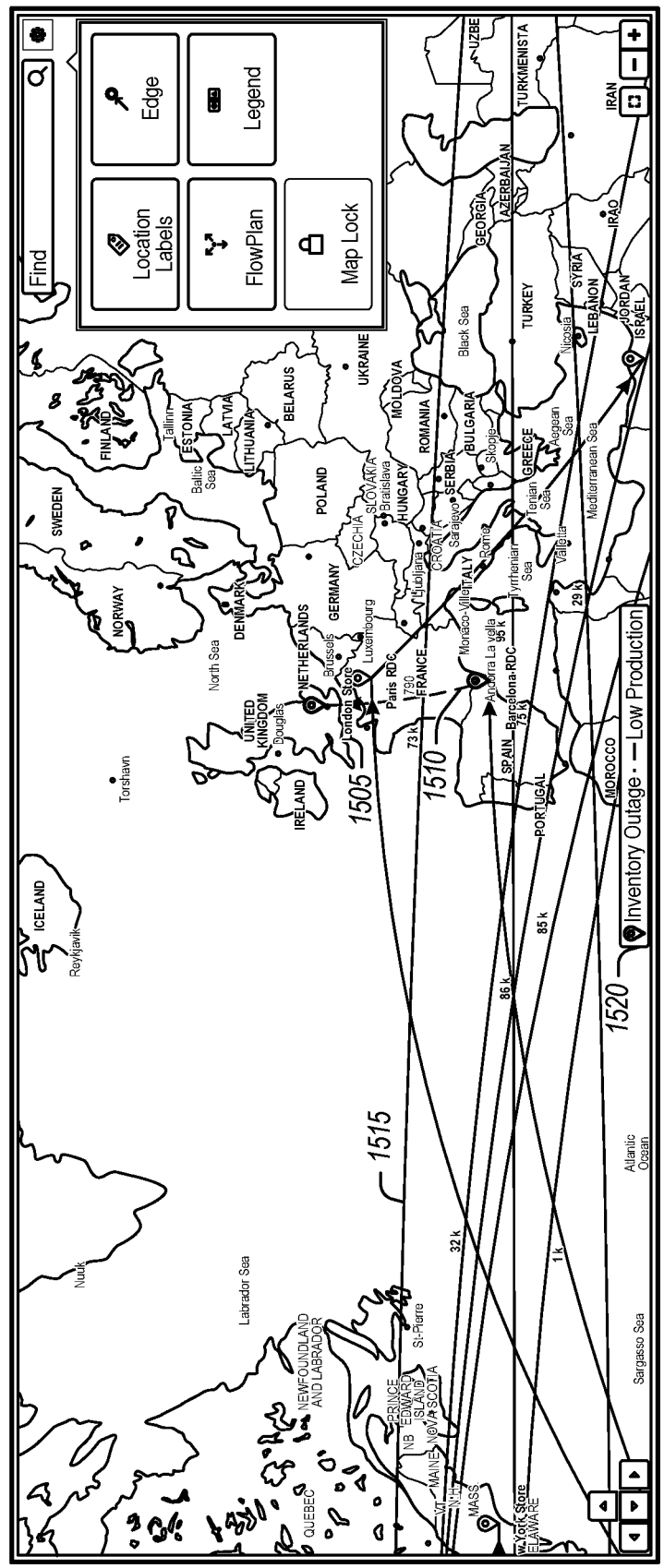
FIG. 15 illustrates an example of a map view with location labels, edges, flow plans, and legends controls in an enabled mode for an aggregated physical and logical network mesh view, according to an embodiment.
Figure 16:
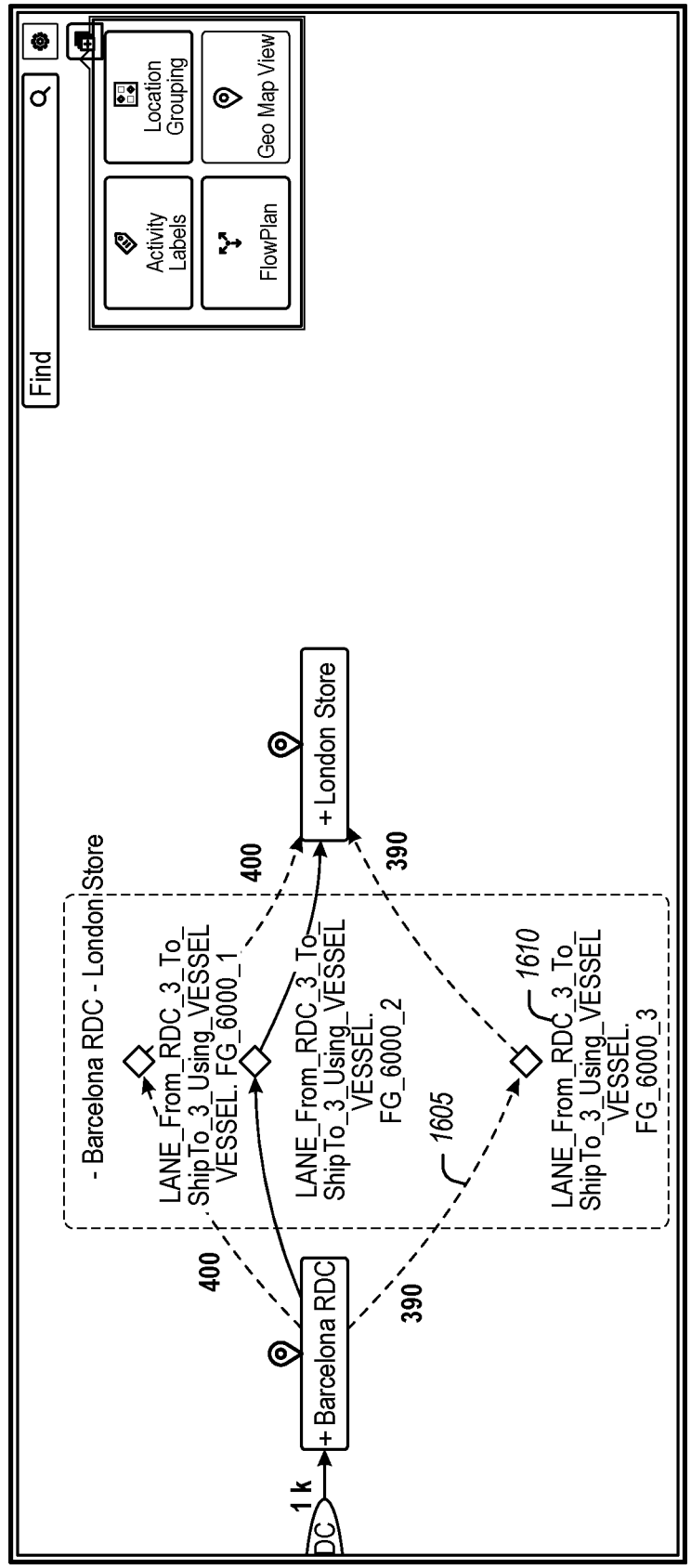
FIG. 16 illustrates an example of a network view with an activity label control and flow plan control activated and in an enabled mode for an aggregated physical and logical network mesh view, according to an embodiment.
Figure 17:
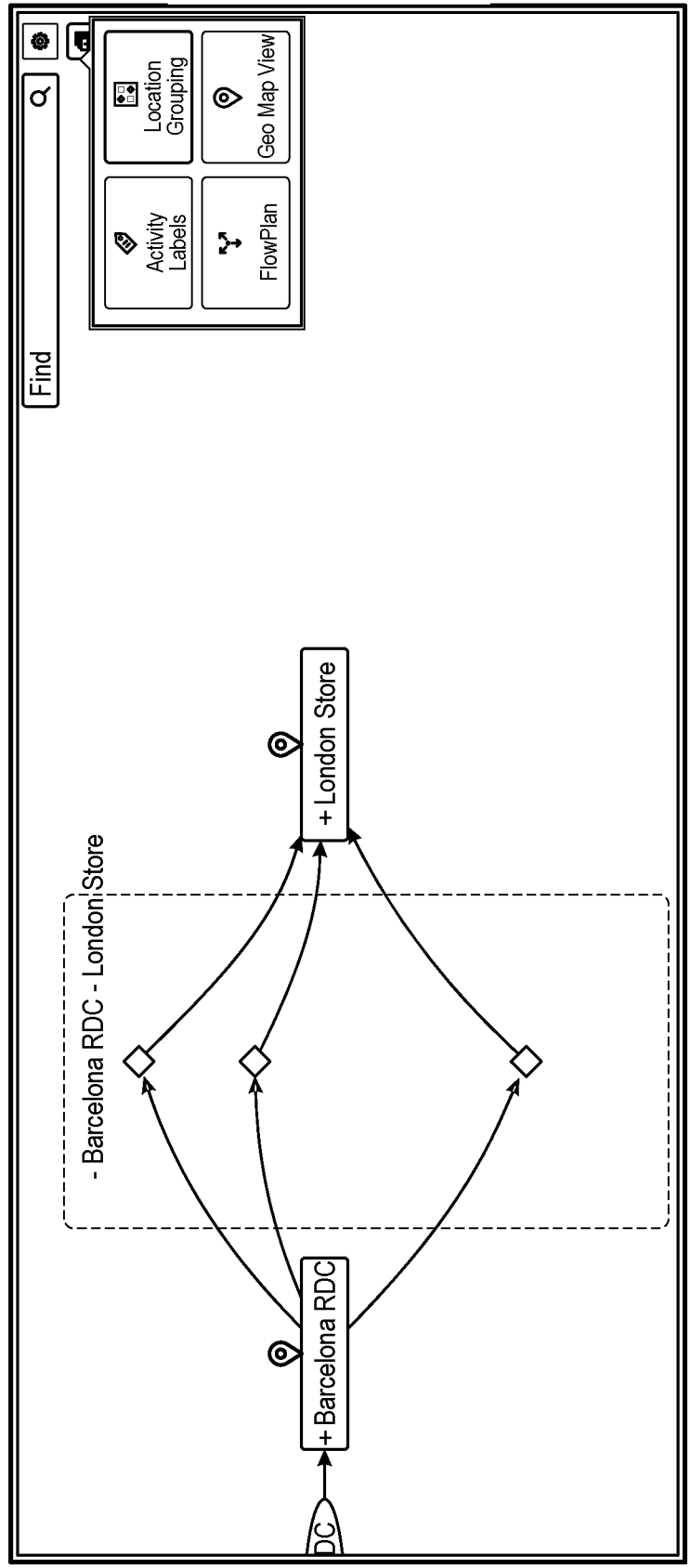
FIG. 17 illustrates an example of a network view with an activity label control and flow plan control deactivated and in a disabled mode for an aggregated physical and logical network mesh view, according to an embodiment.

FIG. 13 illustrates an example of a location view 1300 in a center of a viewport. The location view 1300 may transition around a location 1305. FIG. 14 illustrates an example of a map view 1400 with location labels, edges, flow plans, and legend controls in a control set 1405 generated by the UI control manager 170 in a disabled mode. FIG. 15 illustrates an example of a map view 1500 with location labels, edges, flow plans, and legend controls activated in an enabled mode that causes the UI generator 160 to display location labels (e.g., London Store location label 1505, etc.), edges (e.g., edge 1510, etc.), flow plans (e.g., flow plan 1515, etc.), and legends (e.g., legend 1520, etc.). FIG. 16 illustrates an example of a network view 1600 with an activity label control and flow plan control that is activated and in an enabled mode causing the UI generator 160 to display activity labels and flow plans. FIG. 17 illustrates an example of a network view 1700 with an activity label control deactivated and flow plan control activated that does not display activity labels in contrast to FIG. 16, but does include display of the flow plans similar to FIG. 16.

Returning to the description of FIG. 1, the UI view updater 162 updates (e.g., re-renders, sends a refresh command, etc.) the display based on updates received to the supply chain graph network 120 or upon receipt of display configuration options from user input. The array calculator 164 may calculate and maintain data arrays for use by the UI control manager 170 and other components of the system

150. Example data structures and components are provided to implement functionality of the systems and techniques discussed herein.

A variety of arrays may be calculated and maintained by the array calculator 164. A location array may be generated as an array of locations to be plotted on a map generated by the map generator 174. Each location has longitude and latitude information that is used in plotting the map. Each location has a field for a formatting color. If no formatting is selected, a default theme color may be automatically selected. An example data structure for a location array is shown in TABLE 1.

TABLE 1

[{Name:'Dallas',
DisplayName:"Dallas",
Latitude:32.77,
Longitude:−96.79,
Color: 'rgba(0,114,73,1)'
}]

An edge array is an array of lines between locations and a flow volume between the locations. It has form: from location, to location, flow volume, and color formatting fields. An example data structure for an edge array is shown in TABLE 2.

TABLE 2

[{From:'Dallas',
To:"Austin",
Value:200k,
Color: 'rgba(0,114,73,1)'
}]
Center: [41.055538, −101.425781]

The UI control manager 170 uses the arrays in generating controls to be passed to the UI generator 160. A CreateAndResetNetwork control component is used to plot location markers and links between them with color formatting. The CreateAndResetNetwork is called when a user drags or zooms in or zooms out and takes as inputs: location array, link array, center coordinates of map, and zoom level. A CreateLegend control component is used to create legends at the bottom of the map and takes as inputs an array having color and label fields. A transition to logical view control component works with the UI generator 160 to generate a display and switch to logical view. The transition to logical view control component takes as inputs: location array, link array, and center location coordinates. A DrawNetwork control component plots the logical view and takes as inputs: location array, link array, zoom level, and center location.

Figure 18:
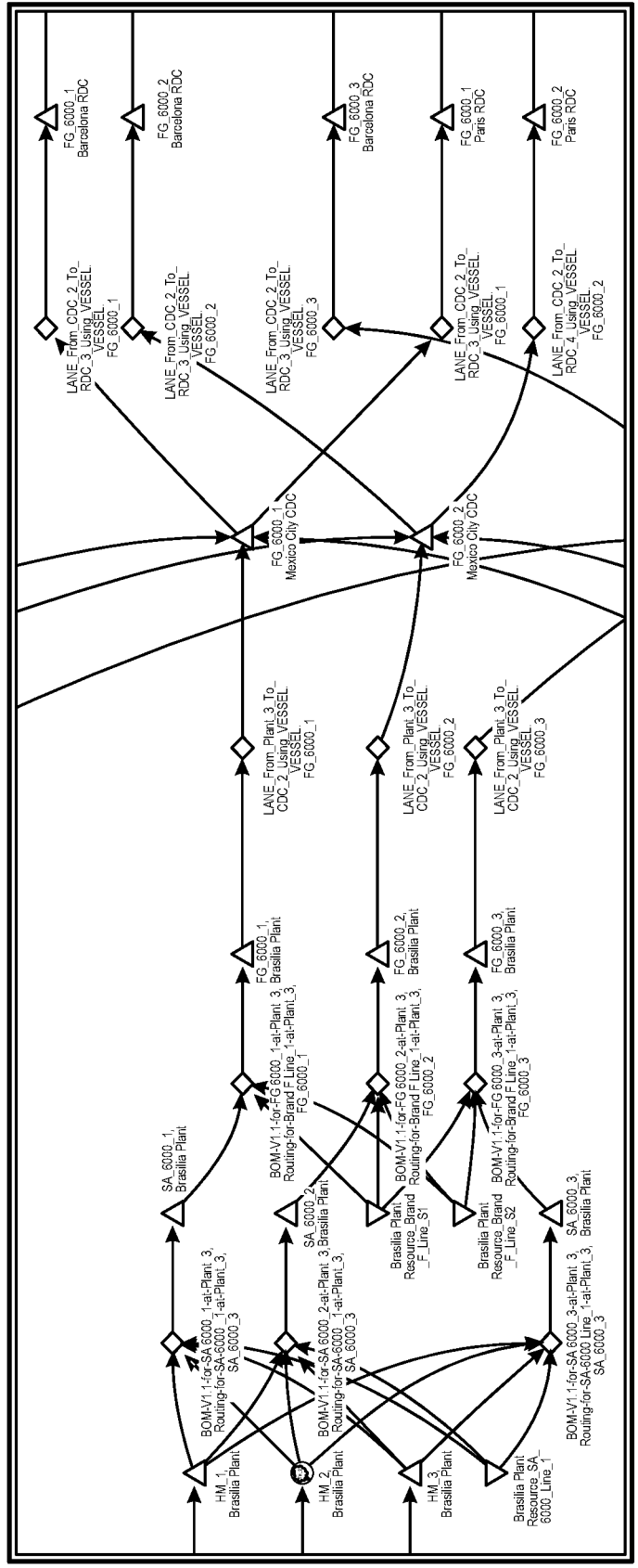
FIG. 18 illustrates an example of an E2E supply chain network that includes a plurality of nodes and edges that represent connections between nodes of the plurality of nodes for an aggregated physical and logical network mesh view, according to an embodiment.
Figure 19:
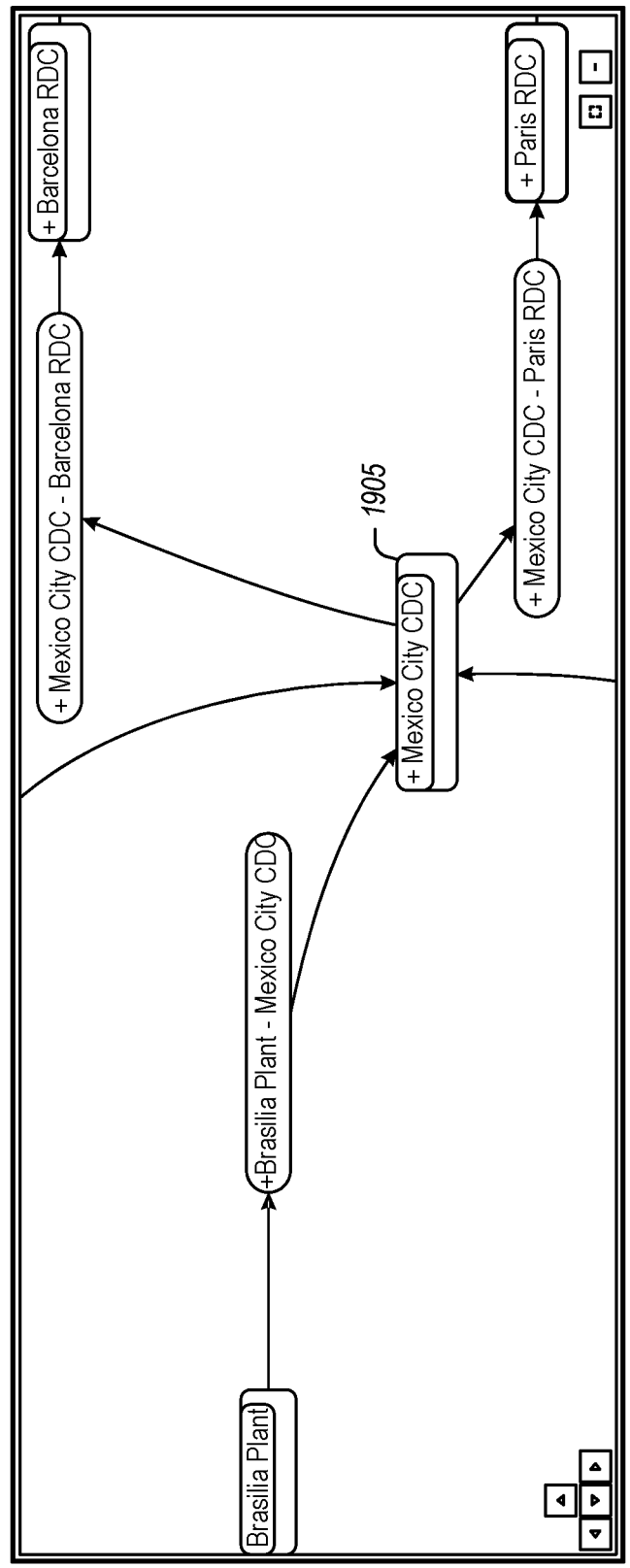
FIG. 19 illustrates an example of a grouped view of an E2E supply chain network that is grouped based on a logical location for an aggregated physical and logical network mesh view, according to an embodiment.

FIG. 18 illustrates an example of an E2E supply chain network 1800 that includes a plurality of nodes, and edges that represent connections between nodes of the plurality of nodes in the supply chain graph network 120. FIG. 19 illustrates and example of a grouped view 1900 of the E2E supply chain network that is grouped based on logical locations (e.g., a Mexico City location 1905, etc.).

Returning to the description of FIG. 1, the grouping engine 166 generates node groupings for nodes of the supply chain graph network 120 for use by the UI control manager 170 in providing grouping controls (e.g., expand groups, contract groups, display group controls, etc.) for display by the UI generator 160. The nodes may be grouped based on edges in the supply chain graph network 120. An example group creation algorithm 3300 is shown in FIG. 33. The GroupByAttribute provides criteria for grouping (e.g., location, activity grouping, etc.).

Returning to the description of FIG. 1, the expansion manager 176 may work in conjunction with the UI control manager 170 to generate group (or other view element) expansion instructions for UI controls. Pseudocode for an example expansion algorithm is shown in TABLE 3. The edges and nodes are added using edgeTOAdd and nodeToAdd, respectively. Data regarding the edges that have been derived (e.g., based on logical information rather than a physical edge of the graph network, etc.) may be cached and the data may be retrieved from the edgeCache.

Figure 20:
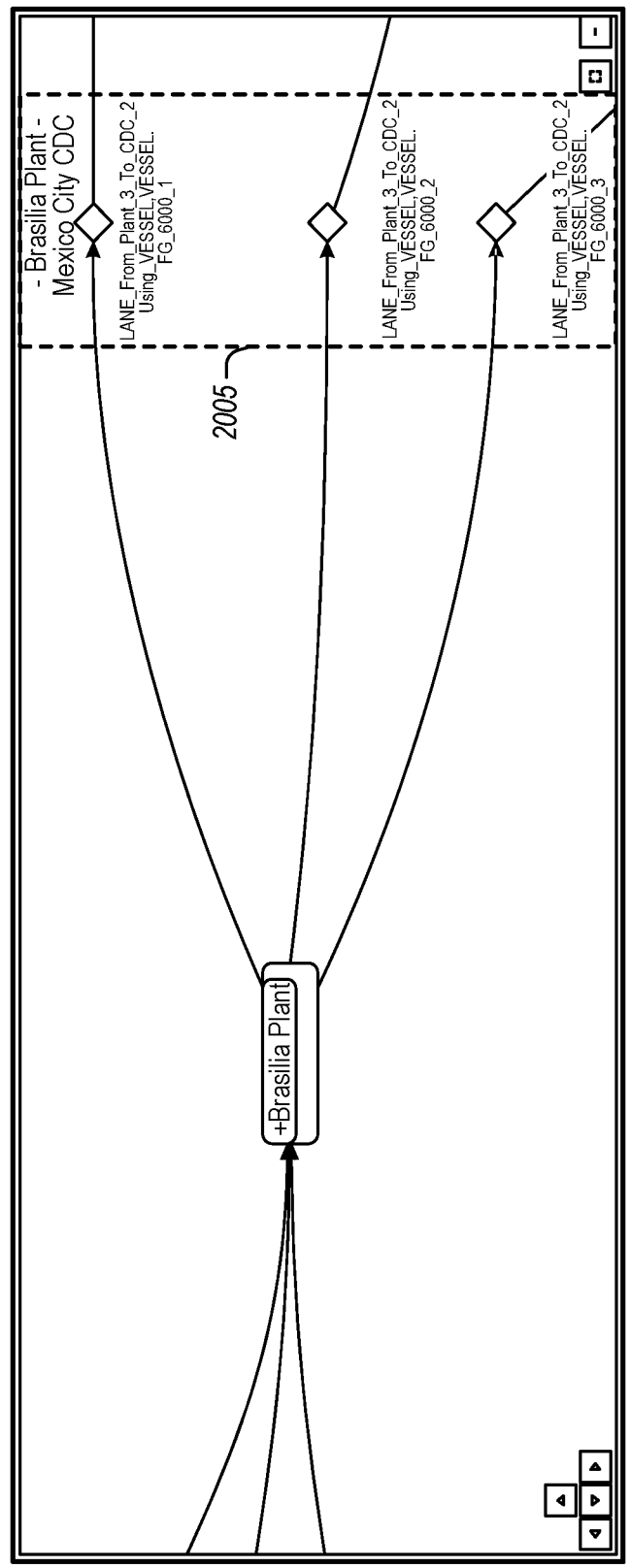
FIG. 20 illustrates an example of a selected location in an expanded view for an aggregated physical and logical network mesh view, according to an embodiment.
Figure 21:
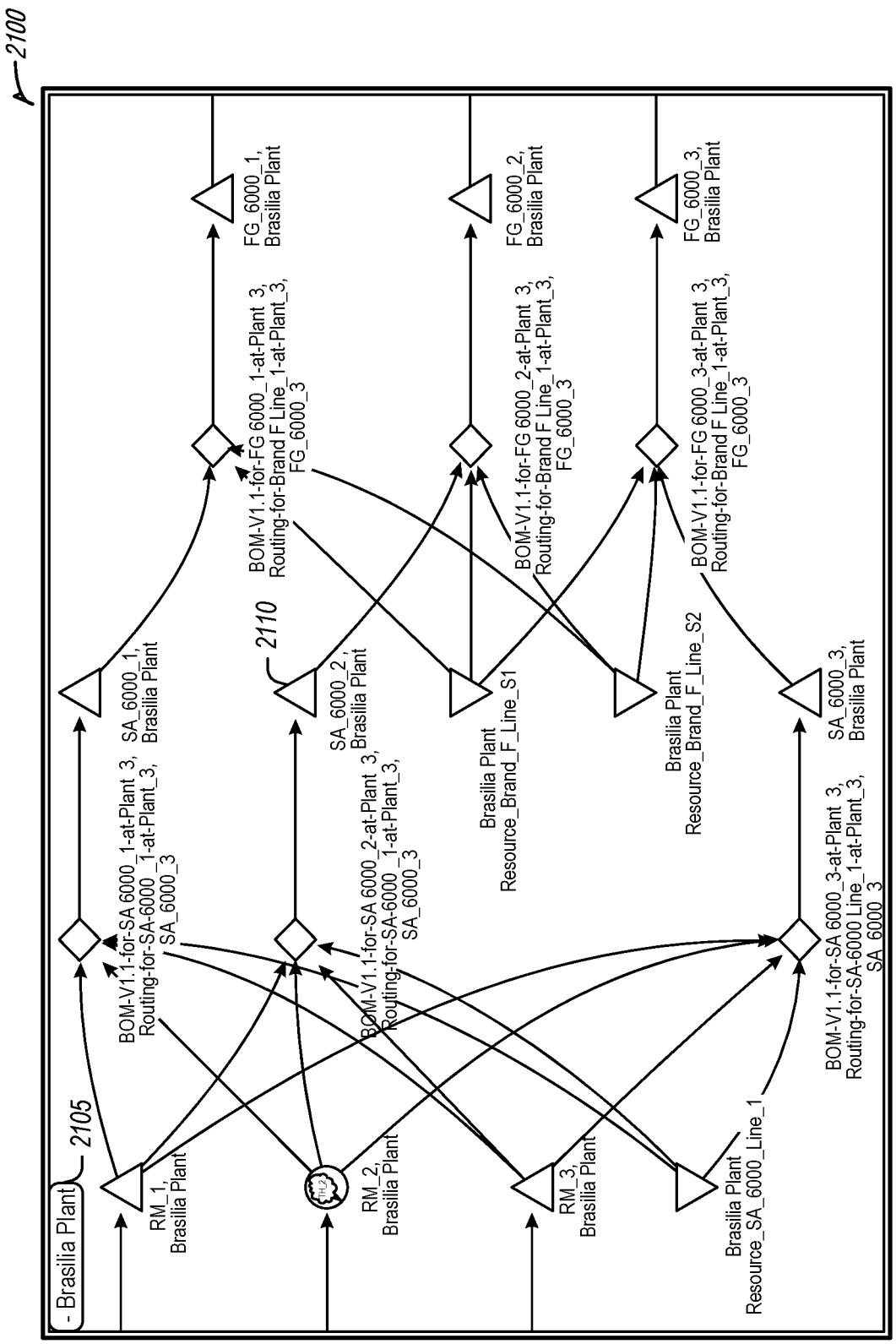
FIG. 21 illustrates an example of an action of an expand node control that removes a grouped node and displays all of the child nodes of the grouped node when the group node is expanded for an aggregated physical and logical network mesh view, according to an embodiment.
Figure 22:
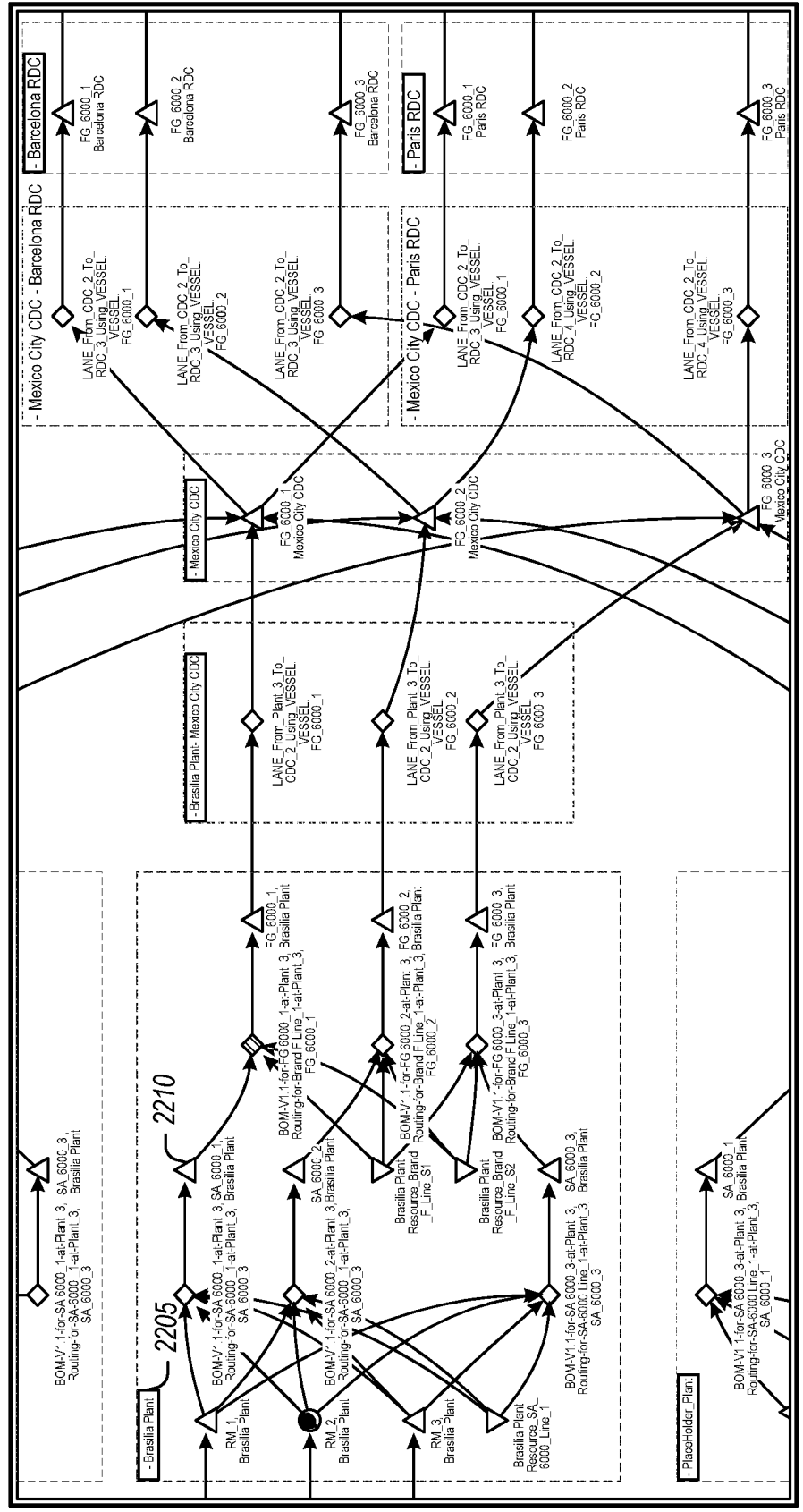
FIG. 22 illustrates an example of action for an expand all nodes control component that retains grouped nodes with child nodes added upon receiving a command to expand all nodes for an aggregated physical and logical network mesh view, according to an embodiment.

TABLE 3 let edgeToAdd ={ }, edgeToRemove ={ }
let nodeToAdd =[ ], nodeToRemove =[ ]
add GroupNode to nodeToRemove
Iterate through each child node of GroupNode:
    Add child node to nodeToAdd
    Start exploring its incoming and outgoing edges
    If edge is GroupByDerived :
        Get edge data from edgeCache and add to EdgeToAdd
    Else :
        Find to and From GroupNode based on incoming and outgoing
        edge and create new edge using to and from node id and add
        to EdgeToRemove FIG. 20 illustrates an example of a selected location 2005 in an expanded view 2000. FIG. 21 illustrates action 2100 of an Expand Node control that removes a grouped node (e.g., the Brasilia Plant node 2105, etc.) and displays all of the child nodes (e.g., a child node 2110, etc.) of the grouped node when the group node is expanded. At run time, edges are found to add and remove (e.g., using the example algorithm of TABLE 4, etc.). The edge data is stored in an edgeCache variable for derived edges and normal edges. FIG. 22 illustrates action 2200 for an Expand all nodes control component that retains grouped nodes (e.g., a Brasilia Plant node 2205, etc.) with child nodes (e.g., a child node 2210, etc.) added upon receiving a command to expand all nodes.

Returning to the description of FIG. 1, the contraction manager 168 may work in conjunction with the UI control manager 170 to generate group (or other view element) contraction instructions for UI controls. An example of a contraction algorithm is shown in TABLE 4.

Figure 23:
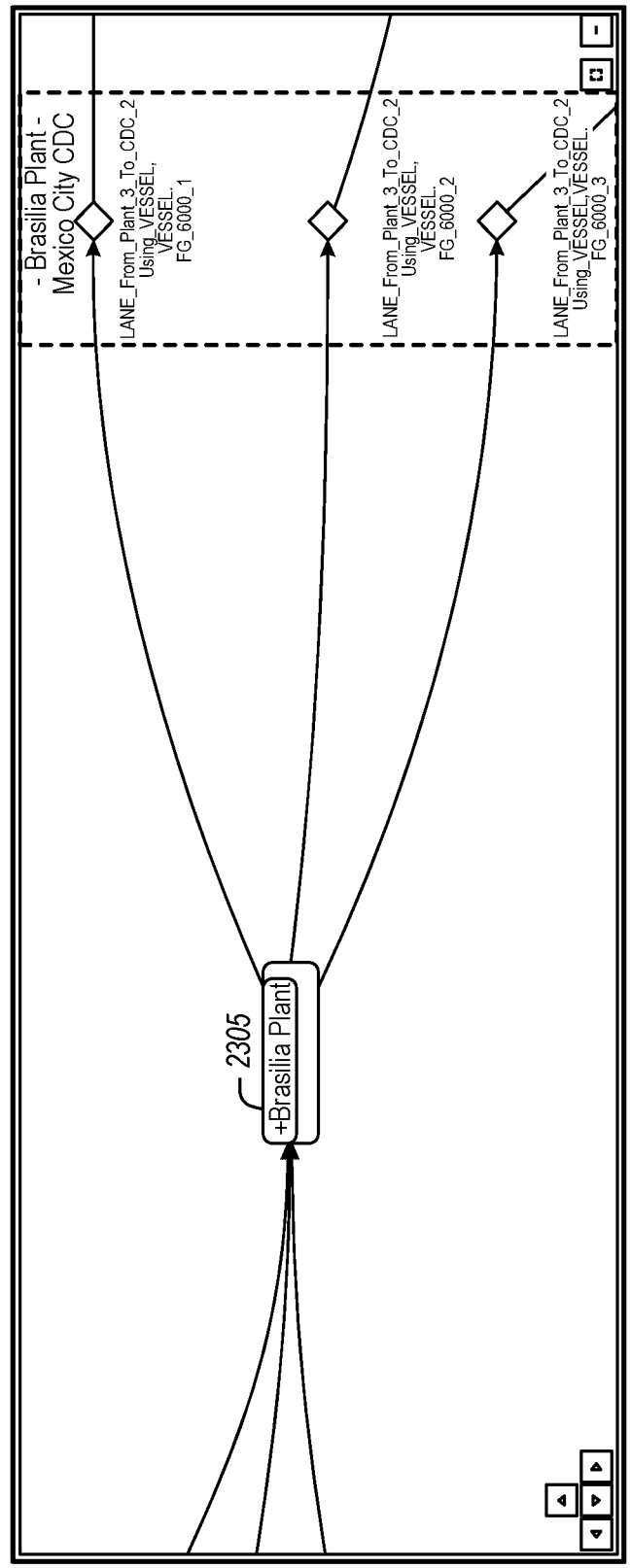
FIG. 23 illustrates an example of action of a collapse node control component that removes the child nodes when collapsing the node and retains the grouped node for an aggregated physical and logical network mesh view, according to an embodiment.
Figure 24:
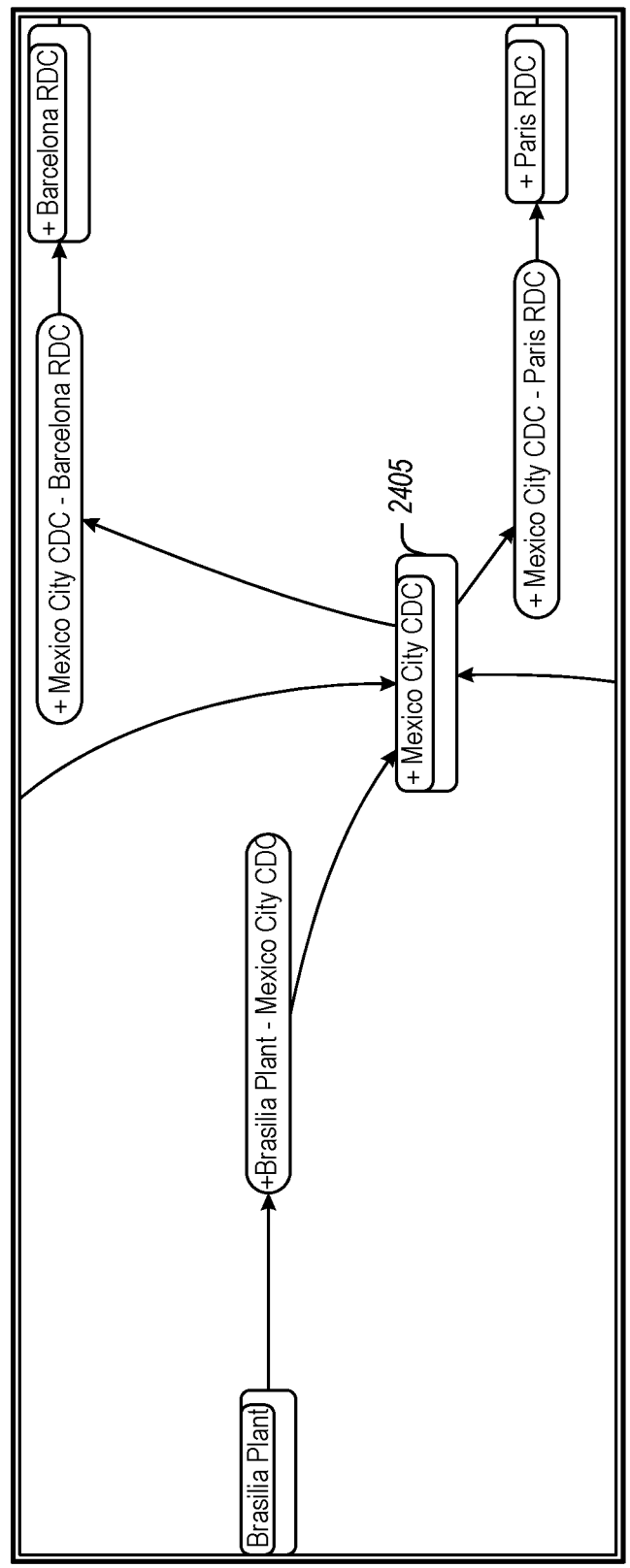
FIG. 24 illustrates an example of action of a collapse all nodes control component that removes child nodes with grouped nodes retained upon receiving a command to collapse all nodes for an aggregated physical and logical network mesh view, according to an embodiment.

TABLE 4 let edgeToAdd ={ }, edgeToRemove ={ }
let nodeToAdd =[ ], nodeToRemove =[ ]
add GroupNode to nodeToAdd
Iterate through each child node of GroupNode:
    Add child node to nodeToRemove
    Start exploring its incoming and outgoing edges
    If edge is GroupByDerived :
        Get edge data from edgeCache and add to EdgeToRemove
    Else :
        Find to and From GroupNode based on incoming and outgoing
        edge and create new edge using to and from node id and add
        to EdgeToAdd FIG. 23 illustrates action 2300 of a Collapse Node control component that removes the child nodes when collapsing an expanded node and retains a grouped node 2305. FIG. 24 illustrates action 2400 of a Collapse all nodes control component removes child nodes with grouped nodes (e.g., grouped node 2405, etc.) retained upon receiving a command to collapse all nodes.

Returning to the description of FIG. 1, the animator 178 may generate animation to be displayed by the UI generator 160 when a node is expanded or collapsed. In an embodiment, constant time is maintained for animation with a time interval constant to expand or collapse the node gradually. A sample animation algorithm is shown in TABLE 5.

TABLE 5

Time Counter=0
Limit= CONSTANT // (e.g., 50)
if Time Counter < Limit
   for each child node
      Animate increase of the Size of the node
      Animate distance of node from grouped node
      Increment Time Counter
      Wait(50) // wait for 50 ms
else if Time Counter== Limit
   Show the label for all the child nodes
   Stop animation A height and width are precomputed for the grouped nodes based upon the position of internal child nodes to provide for the nodes inside a group node. This helps to reduce time required for computation of height and width of group node at request time when the user clicks on a group node. When the user clicks on a group node the group node is removed and an outer box is drawn using the precomputed height and width and expansion of node proceeds with animation.

Returning to the description of FIG. 12, FIG. 12 illustrates an example of a detailed view with grouping expanded to show a complete network including depiction of details such as, by way of example and not limitation, lead time, alternate paths, etc. FIG. 12 illustrates a transition state that illustrates that the view is updated (e.g., by the UI view updater 162) using data for a particular location to generate a logical view when a user zooms a physical view to a certain zoom level (e.g., outside a threshold, displaying a number of elements outside a threshold, etc.).

Returning to the description of FIG. 1, the path tracer 180 may trace or otherwise track paths of activities occurring within a view of the supply chain network graph network 120. Supply chain networks are extensive and visualization of the complete network may not be feasible and visualizations with too much information may prove cryptic. Thus, a user may wish to divide up network visualization to view sections of the network. Visual segmentation of the network may allow the user to quickly find a particular entity and trace an issue occurring in the network from the particular entity (e.g., node) to other entities within the supply chain network graph 120. In case of a constrained network segment, the user may wish to trim the network to only view to the point of constraint and no further. This may enable the user to visually distinguish between different logical entities and enables quick relation of a logical entity to a real-world entity using a variety of shapes, images, and other visual representations. The visual information and multi-dimensional information may be represented using distinct colors. The systems and techniques for supply chain visibility enable generation of visual representation of the network to enable a user to comprehend occurrences in large networks where a full network display me prove meaningless.

Figure 25:
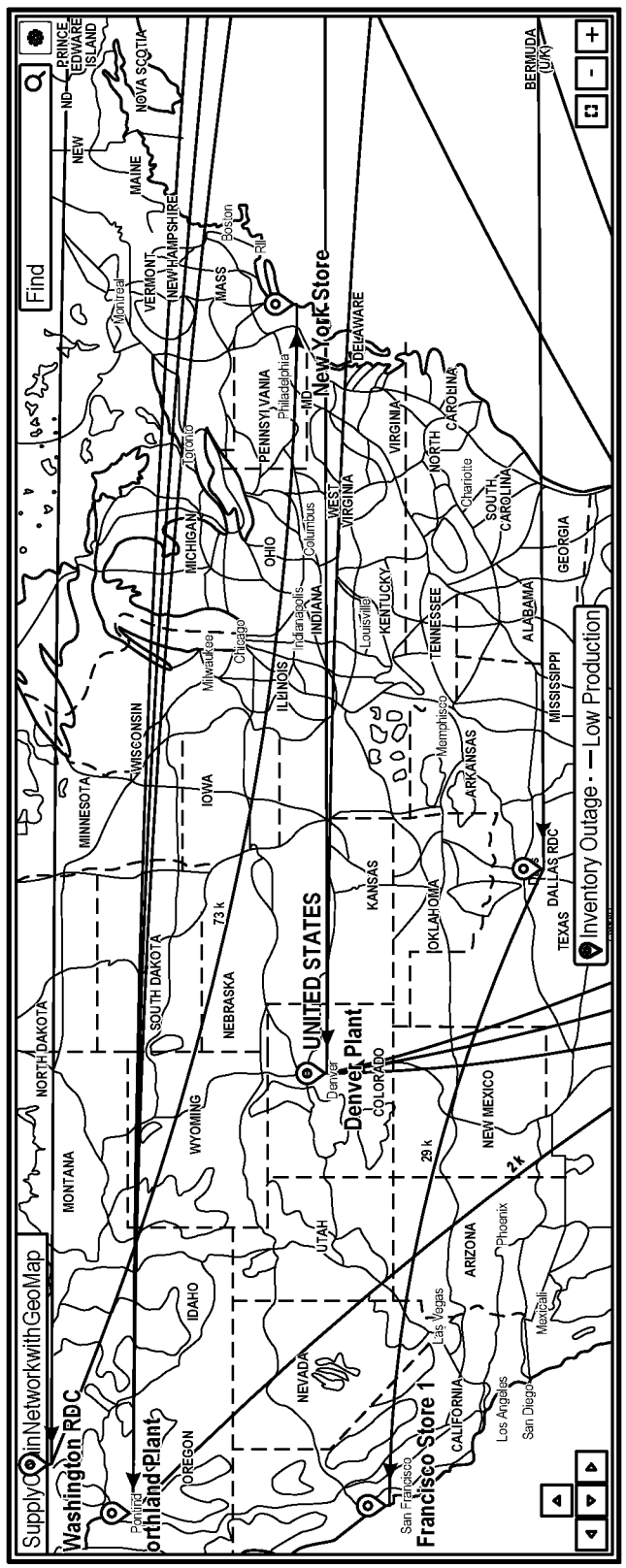
FIG. 25 illustrates an example of an aggregate view that displays a planning horizon that includes total flow of a supply chain graph network for an aggregated physical and logical network mesh view, according to an embodiment.
Figure 26:
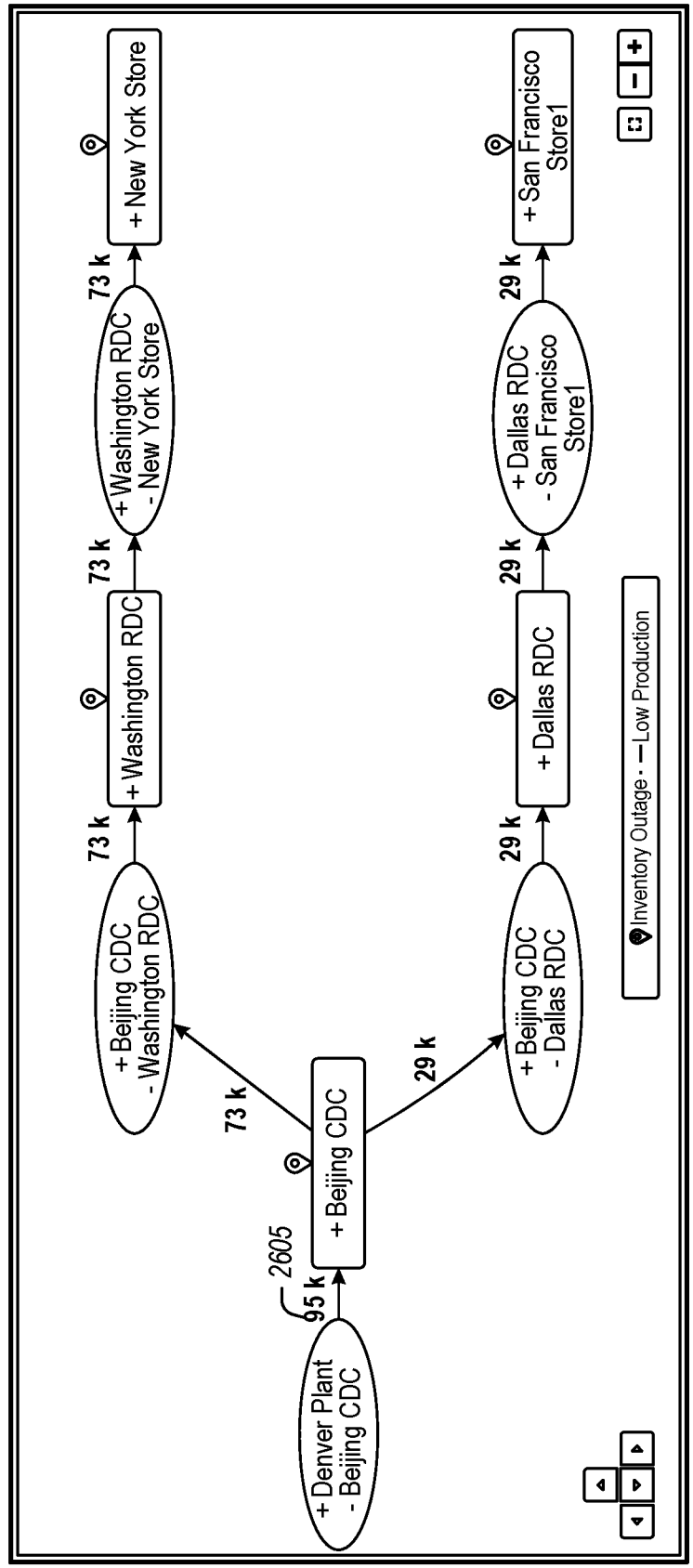
FIG. 26 illustrates an example of a zoom in view that displays additional details that may include aggregate flows for an aggregated physical and logical network mesh view, according to an embodiment.
Figure 27:
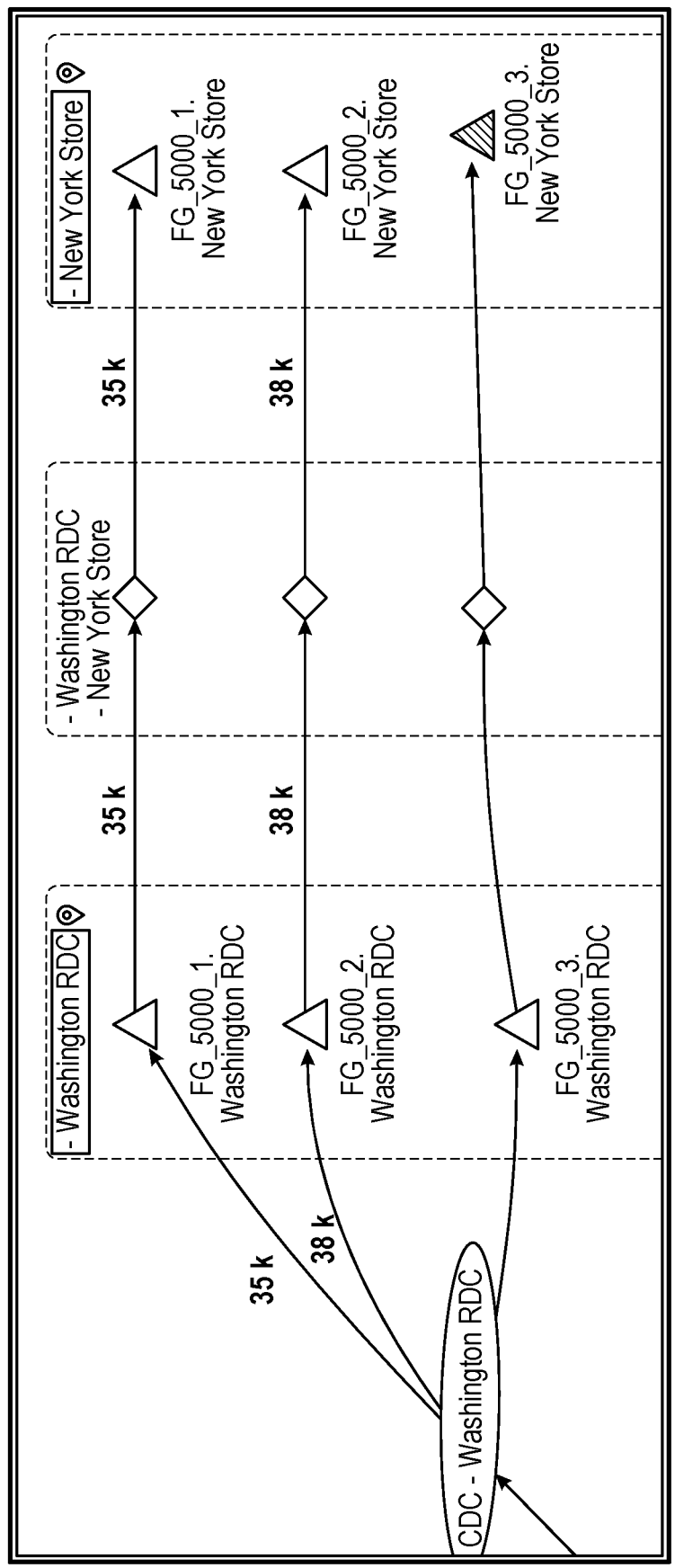
FIG. 27 illustrates an example of a detailed view provided for a time horizon for an aggregated physical and logical network mesh view, according to an embodiment.
Figure 28:
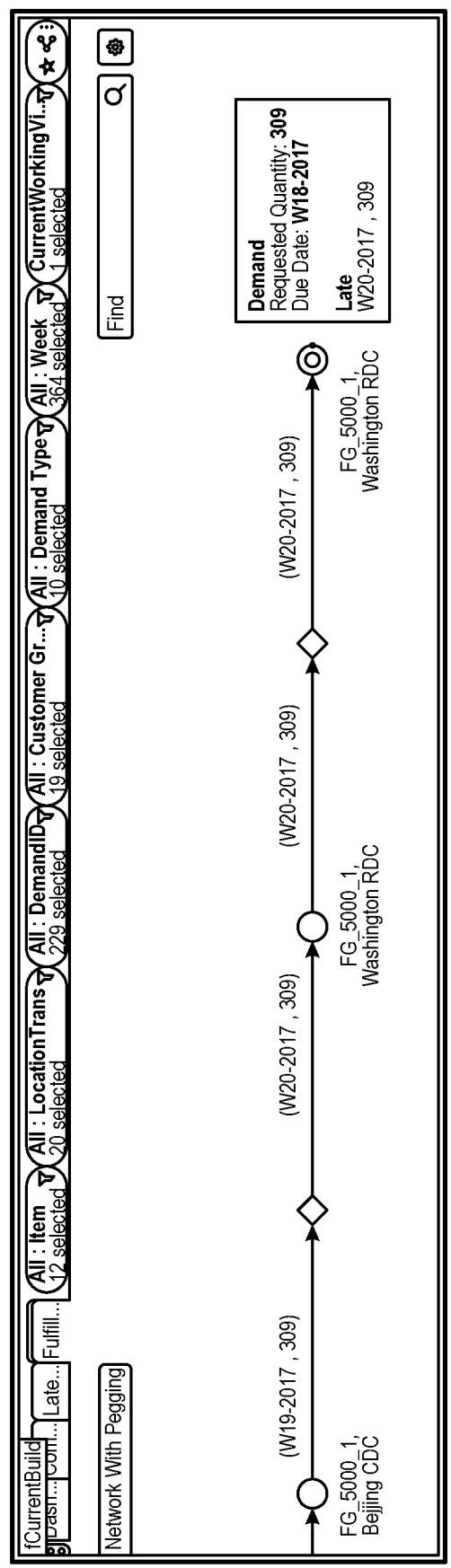
FIG. 28 illustrates an example of a trace view for a particular order that provides fulfillment information for an aggregated physical and logical network mesh view, according to an embodiment.
Figure 29:
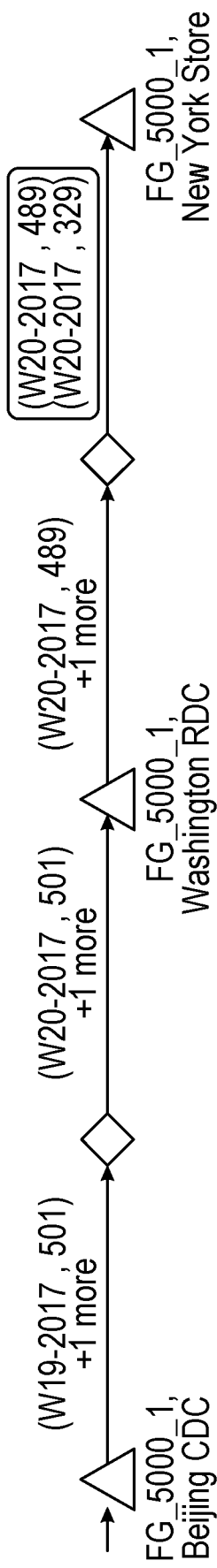
FIG. 29 illustrates an example of a multiple order tracing view for an aggregated physical and logical network mesh view, according to an embodiment.
Figure 30:
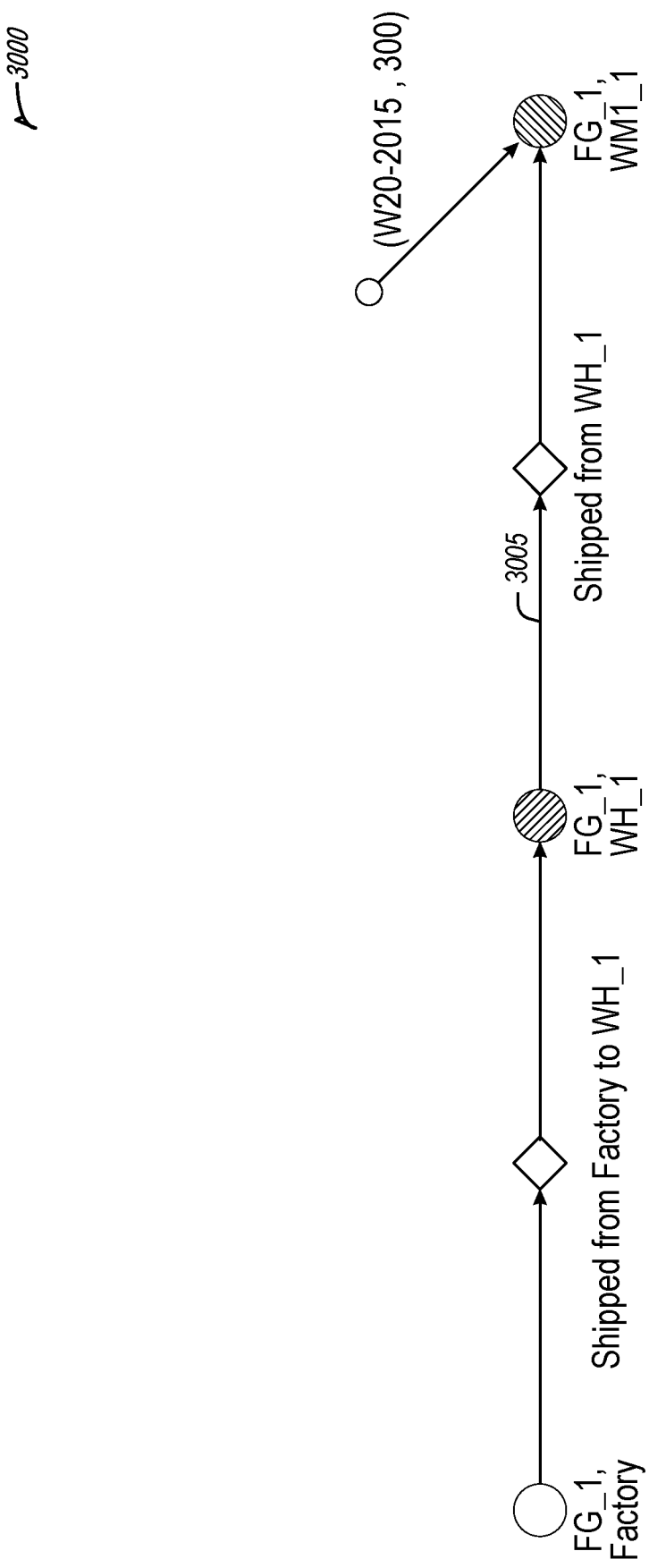
FIG. 30 illustrates an example of a constrained path highlighted in a trace view for an aggregated physical and logical network mesh view, according to an embodiment.

FIG. 25 illustrates an aggregate view 2500 that displays a planning horizon that includes total flow of the supply chain graph network 120. FIG. 26 illustrates a zoom in view 2600 that displays additional details that may include aggregate flows (e.g., aggregate flow 2605, etc.). The aggregate flows may include a collection of underlying flows that may be aggregated (e.g., summed, averaged, calculated as an aggregate value by applying weights, etc.). FIG. 27 illustrates a detailed view provided for a time horizon 2700. FIG. 28 illustrates a trace view 2800 for a particular order that provides fulfillment information. FIG. 29 illustrates an example of a multiple order tracing view 2900. FIG. 30 illustrates a constrained path 3005 highlighted in a trace view 3000.

Returning to the description of FIG. 1, conventional supply chain visualization solutions may provide workable visualizations when the network is small but may be unable to generate meaningful visualization when the network becomes large and complex.

Supply chains of modern enterprises are complex. To get a clear picture of the same on a system with logical graphical elements is equally complex. Presenting the entire ecosystem including tier 1/2/3 suppliers, distributors, etc. the display may be so complicated that users may not be able to interpret what is being displayed. The systems and techniques discussed herein simplify the display of the supply chain network with a physical engine that enables logical entities to be grouped together based on locations and operations. This enables presentation of a comprehensive view of the supply chain. The simplified display allows the user to look inside a location like a plant to determine what is happening by expanding one or more groups of logical entities.

Flow of items in terms of quantities over time is a value used by supply chain planners across the globe. In case of a problem that impacts the flow of items over time, a planner may desire to see traceability of a particular order and find out about a constrained path. The planner may also desire to visually see fulfillments in the event of a problem. The systems and techniques discussed herein generates a user interface that enables a planner to trace a constrained path to view fulfillment problems in a supply chain.

Supply chain network visualization may be used to see and trace flow of a product (e.g., in quantities, etc.) from upstream to downstream. The systems and techniques discussed herein enable generation of a user interface display to show aggregated values and a traceability path for an order to illustrate its path of fulfillment. The display includes highlighting of problem areas in the supply chain and shows a heatmap of demand fulfillment.

The supply chain visibility systems and techniques discussed herein enable display of relevant supply chain information in a visual form that enables a user to quickly trace the demand, view information about demand fulfillment, and look at aggregated adaptations of the supply chain.

Figure 31:
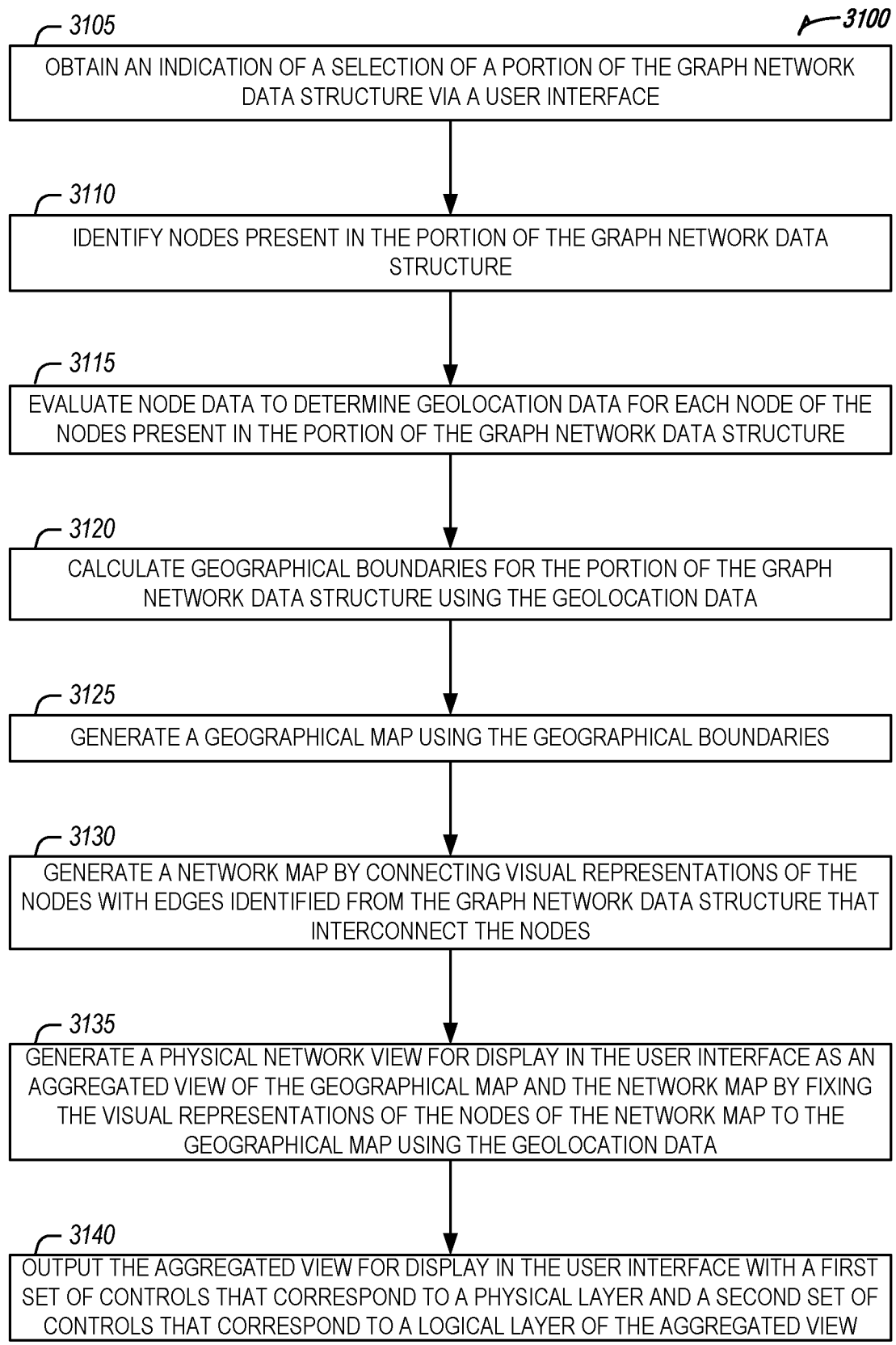
FIG. 31 illustrates a flow diagram of an example of a method for aggregated physical and logical network mesh view, according to an embodiment.

FIG. 31 illustrates a flow diagram of an example of a method 3100 for aggregated physical and logical network mesh view, according to an embodiment. The method 3100 may provide features as described in FIGS. 1-30.

An indication may be obtained (e.g., by the UI generator 160 as described in FIG. 1, etc.) of a selection of a portion of a graph network data structure via a user interface (e.g., at operation 3105). Nodes may be identified (e.g., by the map generator 174 as described in FIG. 1, etc.) that are present in the portion of the graph network data structure (e.g., at operation 3110). Node data may be evaluated to determine (e.g., by the map generator 174 as described in FIG. 1, etc.) geolocation data for each node of the nodes present in the portion of the graph network data structure (e.g., at operation 3115). Geographical boundaries may be calculated (e.g., by the map generator 174 as described in FIG. 1, etc.) for the portion of the graph network data structure using the geolocation data (e.g., at operation 3120). A geographical map may be generated (e.g., by the map generator 174 as described in FIG. 1, etc.) using the geographical boundaries (e.g., at operation 3125). A network map may be generated (e.g., by the layer manager 172 as described in FIG. 1, etc.) by connecting visual representations of the nodes with edges identified from the graph network data structure that interconnect the nodes (e.g., at operation 3130). A physical network view may be generated (e.g., by the layer manager 172 in conjunctions with the map generator 174 and the UI generator 160 as described in FIG. 1, etc.) for display in the user interface as an aggregated view of the geographical map and the network map by fixing the visual representations of the nodes of the network map to the geographical map using the geolocation data (e.g., at operation 3135). The geographical map may represent a physical layer of the aggregated view and the network map may represent a logical layer of the aggregated view.

The aggregated view may be output (e.g., by the UI generator 160 as described in FIG. 1, etc.) for display in the user interface with a first set of controls (e.g., generated by the UI control manager 170 as described in FIG. 1, etc.) that correspond to the physical layer and a second set of controls that correspond to the logical layer (e.g., at operation 3140). In an example, the first set of controls may include at least one of a zoom control, a legend enablement control, a label enablement control, a flow plan display control, and an edge display control. In an example, upon activation of an enabled function of the flow plan display control, a path of a flow of a resource may be traced within the logical layer. A visual representation may be generated for the path. The visual representation of the path may be output within the logical layer. The visual representation of the path may attach visual representations of a set of nodes traversed by the flow in the logical layer. It may be determined that a constraint exists in the flow at a node of the set of nodes along the path. A first highlighting effect may be applied to a visual representation of the node in the logical layer based on a classification of the constraint and a second highlighting effect may be applied to the visual representation of the path based on a criticality level for the flow calculated using the constraint.

In an example, upon activation of an enabled function of the edge display control, incoming and outgoing edges may be identified for a node in the logical layer from the graph network data structure. A visual representations may be generated of the incoming and outgoing edges and the visual representations of the incoming and outgoing edges may be output within the logical layer, wherein the visual representations are attached to a visual representation of the node in the logical layer.

In an example, the second set of controls may include at least one of a zoom control, a legend enablement control, a label enablement control, a flow plan display control, and an edge display control. In an example, upon activation of the zoom control, a zoom level may be identified for the activation. The geographical boundaries may be recalculated for the portion of the graph network data structure using the zoom level. A set of zoom nodes may be determined from the nodes present in the portion of the graph network data structure using the recalculated geographical boundaries and visual representations of the set of zoom nodes may be output within the logical layer, the visual representations of the set of zoom nodes sized based on the zoom level. In an example, it may be determined that the zoom level is outside a threshold and display of the geographical map may be ceased while maintaining relative position of the set of zoom nodes based on respective geographical locations of the physical layer to which respective nodes of the set of zoom nodes are affixed.

In an example, it may be determined that a node of the portion of the graph network data structure is eligible to be grouped based on a grouping attribute of the node. A set of child nodes may be identified for the node by evaluating incoming edges and outgoing edges of the node present in the portion of the graph network data structure. A group may be generated for the node using the grouping attribute. The identified child nodes may be added to the group. Data for the incoming edges may be aggregated into an aggregated incoming data set and the data for the outgoing edges may be aggregated into an aggregated outgoing data set. A visual representation of an outgoing edge may be generated using the aggregated outgoing data set and a visual representation of an incoming edge may be generated using the aggregated incoming data set. A visual representation of the group may be generated for display in the user interface in the logical layer and the visual representation of the outgoing edge and the visual representation of the incoming edge may be attached to the visual representation of the group in the logical layer.

In an example, a group expansion command may be obtained from a grouping control of the second set of controls. Incoming and outgoing edges may be identified for the identified child nodes in the group. Edge data may be extracted for the incoming and outgoing edges. Visual representations may be generated of the node and the identified child nodes. Visual representations may be generated of the incoming and outgoing edges using the edge data. The visual representation of the outgoing edge and the visual representation of the incoming edge may be removed from the logical layer. The visual representation of the group may be converted to a visual container in the logical layer. In an example, the group may be visually represented as a label and the element may be converted to a dropdown element, visual array, etc. to hold and display the child nodes. Thus, the display element and underlying data structure may be transformed to facilitate grouping and ungrouping nodes or other display elements of a visual representation. The visual representations of the node and the identified child nodes may be output in the visual container and the visual representations of the incoming and outgoing edges may be output attached to a respective child node visualization for each visualization representation of an incoming or outgoing edge of the visual representations of the incoming and outgoing edges for display in the logical layer.

In an example, a group compaction command may be obtained from a grouping control of the second set of controls. The visual representations of the node and the identified child nodes may be removed from the visual container. The visual representations of the incoming and outgoing edges may be removed from the logical layer. The visual container may be converted to the visual representation of the group in the logical layer. The visual representation of the outgoing edge may be generated using the aggregated outgoing data set and the visual representation of the incoming edge using the aggregated incoming data set and the visual representation of the outgoing edge and the visual representation of the incoming edge may be attached to the visual representation of the group in the logical layer.

Figure 32:
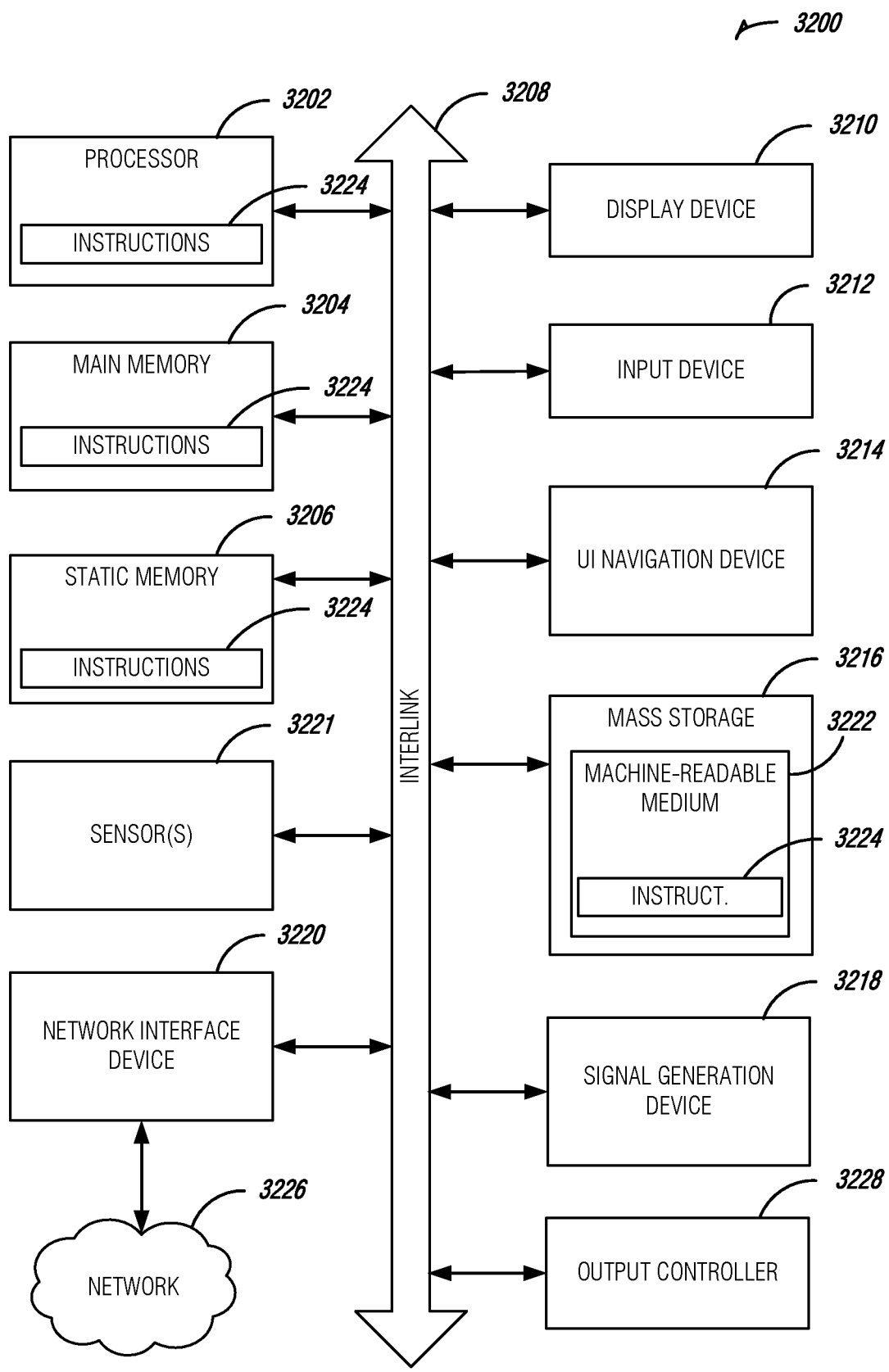
FIG. 32 is a block diagram illustrating an example of a machine upon which one or more embodiments may be implemented.

FIG. 32 illustrates a block diagram of an example machine 3200 upon which any one or more of the techniques (e.g., methodologies) discussed herein may perform. In alternative embodiments, the machine 3200 may operate as a standalone device or may be connected (e.g., networked) to other machines. In a networked deployment, the machine 3200 may operate in the capacity of a server machine, a client machine, or both in server-client network environments. In an example, the machine 3200 may act as a peer machine in peer-to-peer (P2P) (or other distributed) network environment. The machine 3200 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 3200 may include a hardware processor 3202 (e.g., a central processing unit (CPU), a graphics processing unit (GPU), a hardware processor core, or any combination thereof), a main memory 3204 and a static memory 3206, some or all of which may communicate with each other via an interlink (e.g., bus) 3208. The machine 3200 may further include a display unit 3210, an alphanumeric input device 3212 (e.g., a keyboard), and a user interface (UI) navigation device 3214 (e.g., a mouse). In an example, the display unit 3210, input device 3212 and UI navigation device 3214 may be a touch screen display. The machine 3200 may additionally include a storage device (e.g., drive unit) 3216, a signal generation device 3218 (e.g., a speaker), a network interface device 3220, and one or more sensors 3221, such as a global positioning system (GPS) sensor, compass, accelerometer, or other sensors. The machine 3200 may include an output controller 3228, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 3216 may include a machine readable medium 3222 on which is stored one or more sets of data structures or instructions 3224 (e.g., software) embodying or utilized by any one or more of the techniques or functions described herein. The instructions 3224 may also reside, completely or at least partially, within the main memory 3204, within static memory 3206, or within the hardware processor 3202 during execution thereof by the machine 3200. In an example, one or any combination of the hardware processor 3202, the main memory 3204, the static memory 3206, or the storage device 3216 may constitute machine readable media.

While the machine readable medium 3222 is illustrated as a single medium, the term "machine readable medium" may include a single medium or multiple media (e.g., a centralized or distributed database, and/or associated caches and servers) configured to store the one or more instructions 3224.

The term "machine readable medium" may include any medium that is capable of storing, encoding, or carrying instructions for execution by the machine 3200 and that cause the machine 3200 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 3224 may further be transmitted or received over a communications network 3226 using a transmission medium via the network interface device 3220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 3220 may include one or more physical jacks (e.g., Ethernet, coaxial, or phone jacks) or one or more antennas to connect to the communications network 3226. In an example, the network interface device 3220 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 3200, and includes digital or analog communications signals or other intangible medium to facilitate communication of such software.

Additional Notes & Examples

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for generating an aggregated view of a graph network data structure having a geographical layer and a network layer comprising:
    at least one processor; and
    memory including instructions that, when executed by the at least one processor, cause the at least one processor to perform operations to:
        cause display of the graph network data structure in a user interface presented on a display device coupled to the system;
        obtain a selection of a portion of the graph network data structure via the user interface;
        identify nodes in the portion of the graph network data structure;
        generate a physical network view for display in the user interface as an aggregated view of a geographical map and a network map by fixing visual representations of the nodes of the network map to the geographical map using geolocation data, wherein the geographical map represents a physical layer of the aggregated view and the network map represents a logical layer of the aggregated view;
        cause display of the aggregated view in the user interface with a first set of controls that correspond to the physical layer and a second set of controls that correspond to the logical layer;
        determine, based on a grouping attribute of a node of the portion of the graph network data structure, that the node is eligible to be grouped;
        identify a set of child nodes for the node by evaluating incoming edges and outgoing edges of the node present in the portion of the graph network data structure;
        generate a group for the node using the grouping attribute;
        add the identified set of child nodes to the group;
        aggregate data for the incoming edges into an aggregated incoming data set and data for the outgoing edges into an aggregated outgoing data set;
        generate a visual representation of an outgoing edge using the aggregated outgoing data set and a visual representation of an incoming edge using the aggregated incoming data set;
        generate a visual representation of the group for display in the user interface in the logical layer; and
        display the visual representation of the outgoing edge and the visual representation of the incoming edge proximate to the visual representation of the group in the logical layer.

2. The system of claim 1, the memory further comprising instructions that, when executed by the at least one processor, cause the at least one processor to perform operations to:
    obtain a group expansion command from a grouping control of the second set of controls;
    identify incoming and outgoing edges for the identified set of child nodes in the group;
    extract edge data for the incoming and outgoing edges;

generate a visual representations of the node and the identified set of child nodes;
generate visual representations of the incoming and outgoing edges using the edge data;
remove the visual representation of the outgoing edge and the visual representation of the incoming edge from the logical layer;
convert the visual representation of the group to a visual container in the logical layer;
output the visual representations of the node and the identified set of child nodes in the visual container; and
output the visual representations of the incoming and outgoing edges attached to a respective child node visualization for each visualization representation of an incoming or outgoing edge of the visual representations of the incoming and outgoing edges for display in the logical layer.

3. The system of claim 2, the memory further comprising instructions that, when executed by the at least one processor, cause the at least one processor to perform operations to:
obtain a group compaction command from a grouping control of the second set of controls;
remove the visual representations of the node and the identified set of child nodes from the visual container;
remove the visual representations of the incoming and outgoing edges from the logical layer;
convert the visual container to the visual representation of the group in the logical layer;
generate the visual representation of the outgoing edge using the aggregated outgoing data set and the visual representation of the incoming edge using the aggregated incoming data set; and
attach the visual representation of the outgoing edge and the visual representation of the incoming edge to the visual representation of the group in the logical layer.

4. The system of claim 1, wherein the first set of controls includes at least one of a zoom control, a legend enablement control, a label enablement control, a flow plan display control, and an edge display control.

5. The system of claim 4, the memory further comprising instructions that, when executed by the at least one processor, cause the at least one processor to perform operations to:
upon activation of an enabled function of the flow plan display control, trace a path of a flow of a resource within the logical layer;
generate a visual representation of the path;
output the visual representation of the path within the logical layer, wherein the visual representation of the path attaches visual representations of a set of nodes traversed by the flow in the logical layer;
determine a constraint exists in the flow at a node of the set of nodes along the path;
apply a first highlighting effect to a visual representation of the node in the logical layer based on a classification of the constraint; and
apply a second highlighting effect to the visual representation of the path based on a criticality level for the flow calculated using the constraint.

6. The system of claim 4, the memory further comprising instructions that, when executed by the at least one processor, cause the at least one processor to perform operations to:
upon activation of an enabled function of the edge display control, identify incoming and outgoing edges, from the graph network data structure, for a node in the logical layer;
generate a visual representations of the incoming and outgoing edges; and
output the visual representations of the incoming and outgoing edges within the logical layer, wherein the visual representations are attached to a visual representation of the node in the logical layer.

7. The system of claim 1, wherein the second set of controls includes at least one of a zoom control, a legend enablement control, a label enablement control, a flow plan display control, and an edge display control.

8. The system of claim 7, the memory further comprising instructions that, when executed by the at least one processor, cause the at least one processor to perform operations to:
upon activation of the zoom control, identify a zoom level for the activation;
recalculate geographical boundaries for the portion of the graph network data structure using the zoom level;
determine a set of zoom nodes from the nodes present in the portion of the graph network data structure using the recalculated geographical boundaries; and
output visual representations of the set of zoom nodes within the logical layer, the visual representations of the set of zoom nodes sized based on the zoom level.

9. The system of claim 8, the memory further comprising instructions that, when executed by the at least one processor, cause the at least one processor to perform operations to:
determine that the zoom level is outside a threshold; and
cease display of the geographical map while maintaining relative position of the set of zoom nodes based on respective geographical locations of the physical layer to which respective nodes of the set of zoom nodes are affixed.

10. At least one non-transitory machine-readable medium including instructions for generating an aggregated view of a graph network data structure having a geographical layer and a network layer that, when executed by at least one processor, cause the at least one processor to perform operations to:
cause display of the graph network data structure in a user interface presented on a display device;
obtain a selection of a portion of the graph network data structure via the user interface;
identify nodes in the portion of the graph network data structure;
generate a physical network view for display in the user interface as an aggregated view of a geographical map and a network map by fixing visual representations of the nodes of the network map to the geographical map using geolocation data, wherein the geographical map represents a physical layer of the aggregated view and the network map represents a logical layer of the aggregated view;
cause display of the aggregated view in the user interface with a first set of controls that correspond to the physical layer and a second set of controls that correspond to the logical layer;
determine, based on a grouping attribute of a node of the portion of the graph network data structure, that the node is eligible to be grouped;
identify a set of child nodes for the node by evaluating incoming edges and outgoing edges of the node present in the portion of the graph network data structure;
generate a group for the node using the grouping attribute;
add the identified set of child nodes to the group;
aggregate data for the incoming edges into an aggregated incoming data set and data for the outgoing edges into an aggregated outgoing data set;

generate a visual representation of an outgoing edge using the aggregated outgoing data set and a visual representation of an incoming edge using the aggregated incoming data set;

generate a visual representation of the group for display in the user interface in the logical layer; and display the visual representation of the outgoing edge and the visual representation of the incoming edge proximate to the visual representation of the group in the logical layer.

11. The at least one non-transitory machine-readable medium of claim 10, further comprising instructions that, when executed by the at least one processor, cause the at least one processor to perform operations to:

obtain a group expansion command from a grouping control of the second set of controls;

identify incoming and outgoing edges for the identified set of child nodes in the group;

extract edge data for the incoming and outgoing edges;

generate a visual representations of the node and the identified set of child nodes;

generate visual representations of the incoming and outgoing edges using the edge data;

remove the visual representation of the outgoing edge and the visual representation of the incoming edge from the logical layer;

convert the visual representation of the group to a visual container in the logical layer;

output the visual representations of the node and the identified set of child nodes in the visual container; and output the visual representations of the incoming and outgoing edges attached to a respective child node visualization for each visualization representation of an incoming or outgoing edge of the visual representations of the incoming and outgoing edges for display in the logical layer.

12. The at least one non-transitory machine-readable medium of claim 11, further comprising instructions that, when executed by the at least one processor, cause the at least one processor to perform operations to:

obtain a group compaction command from a grouping control of the second set of controls;

remove the visual representations of the node and the identified set of child nodes from the visual container;

remove the visual representations of the incoming and outgoing edges from the logical layer;

convert the visual container to the visual representation of the group in the logical layer;

generate the visual representation of the outgoing edge using the aggregated outgoing data set and the visual representation of the incoming edge using the aggregated incoming data set; and attach the visual representation of the outgoing edge and the visual representation of the incoming edge to the visual representation of the group in the logical layer.

13. The at least one non-transitory machine-readable medium of claim 10, wherein the first set of controls includes at least one of a zoom control, a legend enablement control, a label enablement control, a flow plan display control, and an edge display control.

14. The at least one non-transitory machine-readable medium of claim 13, further comprising instructions that, when executed by the at least one processor, cause the at least one processor to perform operations to:

upon activation of an enabled function of the flow plan display control, trace a path of a flow of a resource within the logical layer;

generate a visual representation of the path;

output the visual representation of the path within the logical layer, wherein the visual representation of the path attaches visual representations of a set of nodes traversed by the flow in the logical layer;

determine a constraint exists in the flow at a node of the set of nodes along the path;

apply a first highlighting effect to a visual representation of the node in the logical layer based on a classification of the constraint; and apply a second highlighting effect to the visual representation of the path based on a criticality level for the flow calculated using the constraint.

15. The at least one non-transitory machine-readable medium of claim 13, further comprising instructions that, when executed by the at least one processor, cause the at least one processor to perform operations to:

upon activation of an enabled function of the edge display control, identify incoming and outgoing edges, from the graph network data structure, for a node in the logical layer;

generate a visual representations of the incoming and outgoing edges; and output the visual representations of the incoming and outgoing edges within the logical layer, wherein the visual representations are attached to a visual representation of the node in the logical layer.

16. A method for generating an aggregated view of a graph network data structure having a geographical layer and a network layer comprising:

causing display of the graph network data structure in a user interface presented on a display device;

obtaining a selection of a portion of the graph network data structure via the user interface;

identifying nodes in the portion of the graph network data structure;

generating a physical network view for display in the user interface as an aggregated view of a geographical map and a network map by fixing visual representations of the nodes of the network map to the geographical map using geolocation data, wherein the geographical map represents a physical layer of the aggregated view and the network map represents a logical layer of the aggregated view;

causing display of the aggregated view in the user interface with a first set of controls that correspond to the physical layer and a second set of controls that correspond to the logical layer;

determining, based on a grouping attribute of a node of the portion of the graph network data structure, that the node is eligible to be grouped;

identifying a set of child nodes for the node by evaluating incoming edges and outgoing edges of the node present in the portion of the graph network data structure;

generating a group for the node using the grouping attribute;

adding the identified set of child nodes to the group;

aggregating data for the incoming edges into an aggregated incoming data set and data for the outgoing edges into an aggregated outgoing data set;

generating a visual representation of an outgoing edge using the aggregated outgoing data set and a visual representation of an incoming edge using the aggregated incoming data set;

generating a visual representation of the group for display in the user interface in the logical layer; and displaying the visual representation of the outgoing edge and the visual representation of the incoming edge proximate to the visual representation of the group in the logical layer.

17. The method of claim 16, further comprising:
obtaining a group expansion command from a grouping control of the second set of controls;
identifying incoming and outgoing edges for the identified set of child nodes in the group;
extracting edge data for the incoming and outgoing edges;
generating a visual representations of the node and the identified set of child nodes;
generating visual representations of the incoming and outgoing edges using the edge data;
removing the visual representation of the outgoing edge and the visual representation of the incoming edge from the logical layer;
converting the visual representation of the group to a visual container in the logical layer;
outputting the visual representations of the node and the identified set of child nodes in the visual container; and
outputting the visual representations of the incoming and outgoing edges attached to a respective child node visualization for each visualization representation of an incoming or outgoing edge of the visual representations of the incoming and outgoing edges for display in the logical layer.

18. The method of claim 17, further comprising:
obtaining a group compaction command from a grouping control of the second set of controls;
removing the visual representations of the node and the identified set of child nodes from the visual container;
removing the visual representations of the incoming and outgoing edges from the logical layer;
converting the visual container to the visual representation of the group in the logical layer;
generating the visual representation of the outgoing edge using the aggregated outgoing data set and the visual representation of the incoming edge using the aggregated incoming data set; and
attaching the visual representation of the outgoing edge and the visual representation of the incoming edge to the visual representation of the group in the logical layer.

19. The method of claim 16, wherein the first set of controls includes at least one of a zoom control, a legend enablement control, a label enablement control, a flow plan display control, and an edge display control.

20. The method of claim 19, further comprising:
upon activation of an enabled function of the flow plan display control, tracing a path of a flow of a resource within the logical layer;
generating a visual representation of the path;
outputting the visual representation of the path within the logical layer, wherein the visual representation of the path attaches visual representations of a set of nodes traversed by the flow in the logical layer;
determining a constraint exists in the flow at a node of the set of nodes along the path;
applying a first highlighting effect to a visual representation of the node in the logical layer based on a classification of the constraint; and
applying a second highlighting effect to the visual representation of the path based on a criticality level for the flow calculated using the constraint.

* * * * *